United States Patent [19]

Mutoh et al.

[11] Patent Number: 5,561,247
[45] Date of Patent: Oct. 1, 1996

[54] PRESSURE SENSOR

[75] Inventors: Eiji Mutoh; Akihiro Niiya, both of Wako; Shigemitsu Ogawa, Tokyo; Fujito Tanaka, Tokyo; Munenori Tsuchiya, Tokyo; Daiji Uehara, Tokyo; Kenji Nagasawa, Tokyo, all of Japan

[73] Assignees: Honda Motor Co., Ltd.; Nagano Keiki Seisakusho, Ltd., both of Tokyo, Japan

[21] Appl. No.: 218,979

[22] Filed: Mar. 28, 1994

[30] Foreign Application Priority Data

Mar. 30, 1993 [JP] Japan ................. 5-015490 U
Mar. 30, 1993 [JP] Japan ................... 5-072531
Mar. 30, 1993 [JP] Japan ................... 5-072532

[51] Int. Cl.$^6$ ........................................... G01L 9/12
[52] U.S. Cl. ................................. 73/724; 73/723
[58] Field of Search ....................... 73/715, 718, 723, 73/724

[56] References Cited

U.S. PATENT DOCUMENTS

| | | | |
|---|---|---|---|
| 4,295,376 | 10/1981 | Bell | 73/724 |
| 4,345,299 | 8/1982 | Ho | 73/724 |
| 4,617,607 | 10/1986 | Park et al. | 73/724 |
| 5,165,281 | 11/1992 | Bell | 73/718 |
| 5,189,916 | 3/1993 | Mizumoto et al. | 73/718 |
| 5,233,875 | 8/1993 | Obermeier et al. | 73/718 |

FOREIGN PATENT DOCUMENTS

| | | |
|---|---|---|
| 57-105943 | of 1982 | Japan . |
| 58-731 | of 1983 | Japan . |
| 2-189435 | of 1990 | Japan . |
| 3-72230 | of 1991 | Japan . |

Primary Examiner—Richard Chilcot
Assistant Examiner—Elizabeth L. Dougherty
Attorney, Agent, or Firm—Flynn, Thiel, Boutell & Tanis, P.C.

[57] ABSTRACT

A pressure sensor of electrostatic capacitance type is disclosed, which detects the pressure of a measurement fluid acting on a pressured surface of an elastic diaphragm from a change in the electrostatic capacitance between opposed electrodes provided on opposed surface of a ceramic base and the elastic diaphragm. The base side electrode comprises a plurality of division electrode one enclosing the next inner one. Of these division electrodes the outermost one is grounded or held at a predetermined voltage, or it is covered by overcoat glass, and thus it is imparted with a function of stabilizing the measurement value. In an electrode hole for leading an electrode to the outside, a path is formed for leading atmospheric air or like fluid providing for the reference pressure for pressure measurement into the space defined between the base and elastic diaphragm.

21 Claims, 16 Drawing Sheets

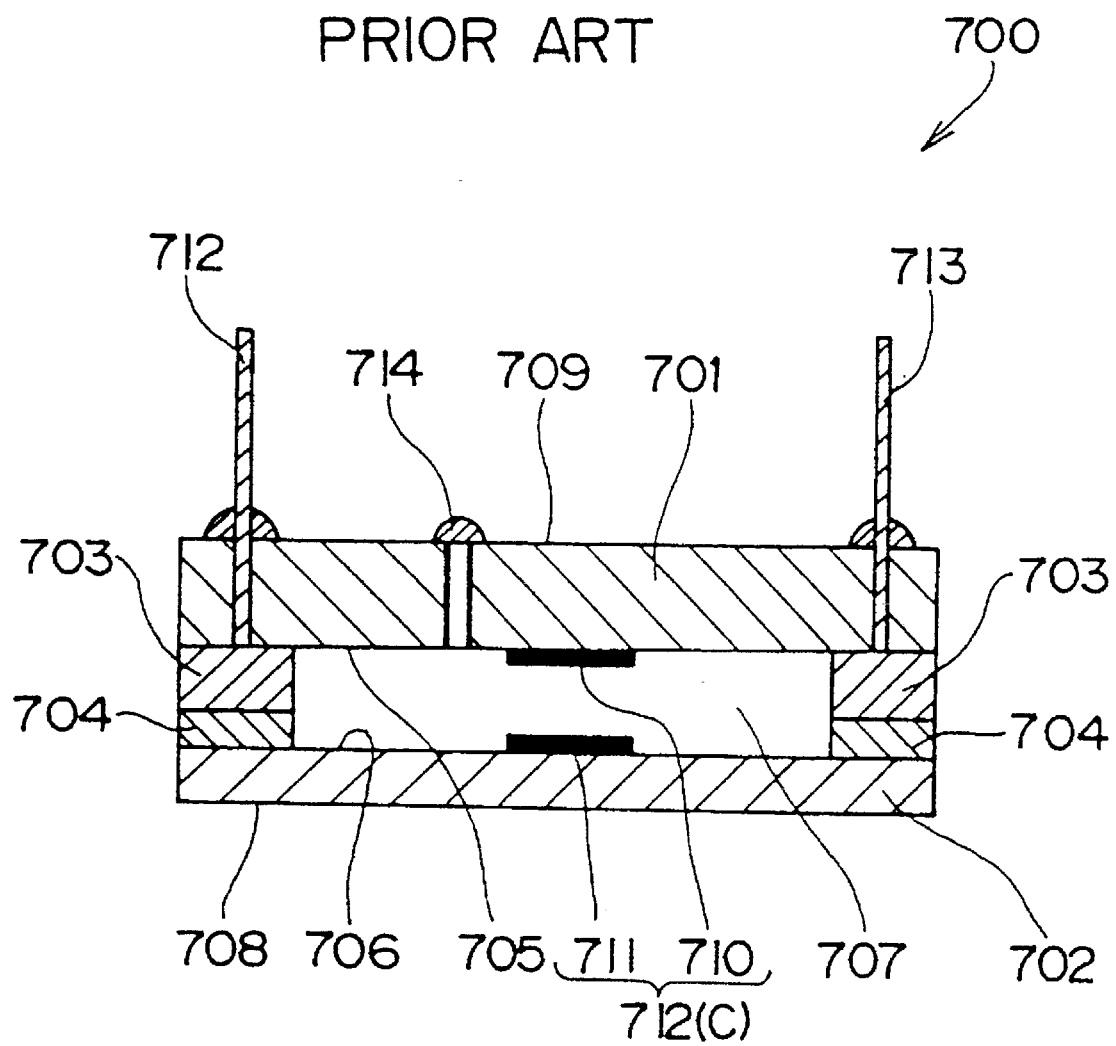

PRESSURE SENSOR

BACKGROUND OF THE INVENTION

1. Field of the Invention

This invention relates to pressure sensors for detecting the pressure of measurement fluids, which can be utilized as pressure sensors of electrostatic capacitance type utilizing changes in the electrostatic capacitance between opposed electrodes for pressure detection.

2. Description of the Related Art

FIG. 18 shows a general prior art pressure sensing element 900 which is used for an electrostatic capacitance type pressure sensor (first prior art example, see Japanese Patent Publication No. S60-34687).

This pressure sensing element 900 comprises a thick base 901 and a thin diaphragm 902 which can be deformed by the pressure of a measurement fluid. The base 901 and diaphragm 902 are disposed parallel and spaced apart by a predetermined distance by a ring-like spacer 903. Between the opposed surfaces 904 and 905 of the base 901 and diaphragm 902, respectively, a space 906 is defined such that it is surrounded by the spacer 903.

The opposed surface 904 of the base 901 is provided with a substantially circular electrode 901. The opposed surface 905 of the diaphragm 902 is also provided with a substantially circular electrodes 911 of the same size as the electrode 910. The electrode 910 and 911 which are opposed by each other form a capacitor 912 with electrostatic capacitance C.

The surface of the diaphragm 902 opposite the opposed surface 905 is a pressured surface 907, to which the pressure of the measurement fluid is applied.

From a portion of the edge of the electrode 910 extends a continuous electrode lead conductor path 913 toward an outer end portion. Also, from a portion of the edge of the electrode 911 extends a continuous electrode lead conductor path 914 toward the outer end portion.

Dashed loops in the drawing represent electric lines of force produced between the electrodes 910 and 911. The electric lines of force are straight in the neighborhood of the center of the electrodes 910 and 911, but near the edge thereof they are disturbed by the conductor paths 913 and 914 and spacer 903.

In this first prior art example, atmospheric air or the like is introduced into the space 906 to set up a reference pressure, while the pressure of the measurement fluid is acted from the pressured surface 907. The diaphragm 902 is thus flexed with the differential pressure. With the flexing of the diaphragm 902, the distance between the electrodes 910 and 911 is changed to change the electrostatic capacitance C of the capacitor 912. This is utilized for detecting the pressure of the measurement fluid. The space 906 may be made vacuum for absolute pressure measurement.

In such first prior art example, for detecting the pressure of the measurement fluid as gauge pressure, it is necessary to introduce atmospheric air into the space 906. However, the dielectric constant of the atmospheric air in the space 906 is subject to changes with changes in the temperature and relative humidity of atmosphere, thus causing changes in the electrostatic capacitance C of the capacitor 912. This makes it impossible to obtain accurate pressure detection. In addition, the insulation resistance between the electrodes 910 and 911 are changed with changes in the temperature and relative humidity of atmosphere, thus again making it impossible to obtain accurate pressure detection.

Further, the electric lines of force produced near the edge of the electrodes 910 and 911 are convex outward as shown in FIG. 18, and the electrostatic capacitance C of the capacitor 912 is influenced and changed by temperature and relative humidity changes, and hence resultant dielectric constant changes, of the materials of the base 901, diaphragm 902 and spacer 903 which are found in the outwardly convex portion of electric lines of force. Further, when an object 920 with an extremely different dielectric constant approaches the diaphragm 902, the electric lines of force become convex toward the object 920, and this affects the electrostatic capacitance C.

Furthermore, since the electrode lead conductor paths 913 and 914 extend outward from the edge of the electrodes 910 and 911, the electric lines of force are caused to become convex outward so as to affect the electrostatic capacitance C and make it impossible to obtain accurate pressure measurement.

FIGS. 19 to 21 show a pressure sensing element 800, which is an improvement over the general pressure sensing element 900 as the first prior art example (second prior art example, see Japanese Patent Laid-Open Publication No. 60-56233).

FIG. 19 is a side sectional view of the element 800, and FIGS. 20 and 21 are plan views showing the element 800 in disassembled states. The shaded portions in FIGS. 20 and 21 are not sections but are made so for facilitating the explanation.

The pressure sensing element 800 is similar in construction to the above first prior art example. That is, a thick base 801 and a thin diaphragm 802 are parallel and spaced apart by a predetermined distance by a ring-like spacer 803. A space 806 surrounded by the spacer 803 is formed between the opposed surfaces 804 and 805 of the base 801 and diaphragm 802, respectively.

On the opposed surface 804 of the base 801 are provided a substantially circular electrode 810 and a partly missing ring-like (i.e., C-shaped) electrode 811 surrounding the electrode 810. On the opposed surface of the diaphragm 802 is provided a substantially circular electrode 812 which has the same outer diameter as that of the outer electrode 811.

The electrodes 810 and 812 which oppose each other form a capacitor 814 with electrostatic capacitance C1, while the electrodes 811 and 812 form a capacitor 815 with electrostatic capacitance C2.

The surface of the diaphragm 802 opposite the opposed surface 805 serves as a pressured surface 807, to which the pressure of the measurement fluid is applied.

From a portion of the edge of the electrode 810 extends a continuous electrode lead conductor path 816 through the missing zone of the electrode 811 toward an outer end portion. From a portion of the outer edge of the electrode 811 extends a continuous electrode lead conductor path 817 toward an outer end portion.

Meanwhile, from a portion of the edge of the electrode 812 extends a continuous electrode lead conductor path 818 toward an outer end portion.

The base 801 has a communication hole 819 communicating the space 806 and the outside. Atmospheric air providing the reference pressure is introduced into the space 806 through the communication hole 819.

In such second prior art example, like the above first prior art example, atmospheric air is introduced into the space 806 to provide the reference pressure, while the pressure of the measurement fluid is acted from the pressured surface 807, thus causing the diaphragm 802 to be flexed with the differential pressure. With the flexing of the diaphragm 802 the distance between the electrodes 810 and 812 and the distance between the electrodes 811 and 812 are changed to change the electrostatic capacitances C1 and C2 of the capacitors 814 and 815. This is utilized for detecting the pressure of the measurement fluid.

In this second prior art example, the electrostatic capacitances C1 and C2 of the capacitors 814 and 815 are affected by changes in the dielectric constant ϵ in the space 806 caused with changes in the temperature, relative humidity, etc. of the space. However, the changes are compensated for through detection of C1/C2 with a measure circuit (not shown), thus permitting accurate pressure measurement. Denoting the inter-electrode distances of the capacitors 814 and 815 by D1 and D2 and the electrode areas of the capacitors by S1 and S2, $$C1/C2=(\epsilon \times S1/D1)/(\epsilon \times S2/D2)=(S1 \times D2)/(S2 \times D1)$$

The dielectric constant ϵ is thus canceled, thus permitting the pressure measurement by compensation for the influence of the changes in the dielectric constant ϵ.

In this second prior art example, however, the electric lines of force that are produced between the outer electrode 811 on the side of the base 801 and the electrode 812 on the side of the diaphragm 802, are influenced and disturbed by the electrode lead conductor paths 817 and 818 and spacer 803. This leads to inconvenience similar to that in the above first prior art example. That is, the electrostatic capacitance C2 of the capacitor 815 is changed with the temperature and relative humidity changes, i.e., accompanied dielectric constant changes, of the materials of the base 801, diaphragm 802 and spacer 803 that are found in the outwardly disturbed portion of the electric lines of force. It is thus impossible to obtain accurate pressure detection.

Further, the outer electrode 811 on the side of the base 801 is partly missing ring-like (i.e., C-shaped) so that the conductor path 816 of the central electrode 810 can extend through the missing portion. This arrangement has end effects on the electrostatic capacitance C2 of the capacitor 815, thus making it impossible to obtain accurate pressure detection.

Further, the electrode 811 is partly missing ring-like and has the conductor path 817 extending outward, and also the substantially circular electrodes 810 and 812 have respective conductor paths 816 and 818 which also extend outward. That is, either electrode is not so simple in shape. This dictates a complicated process of manufacture.

FIG. 22 shows a prior art pressure sensing element 700 used for an electrostatic capacitance type pressure sensor (third prior art example, see Japanese Patent Laid-Open Publication No. S59-148842).

The pressure sensing element 700 comprises a thick base 701 and a thin diaphragm 702 which can be deformed by the pressure of the measurement fluid. The base 701 and diaphragm 702 extend parallel and spaced apart by a predetermined distance by ring-like high-melting glass 703 and low-melting glass spacers 704. A space 707 surrounded by the high- and low-melting glass spacers 703 and 704 is defined between the opposed surfaces of the base 701 and diaphragm 702.

On the opposed surfaces 705 and 706 of the base 701 and diaphragm 702, respectively, respective electrodes 710 and 711 are provided such as to form a capacitor 712 with electrostatic capacitance C.

From the electrodes 710 and 711 leads 712 and 713 are led through the base 701 such as to extent outward from the back 709 of the base 701 (i.e., the surface opposite the opposed surface 705). The back 709 is also provided with a vacuum seal member 714 for vacuum sealing the space 707.

The surface of the diaphragm 702 opposite the opposed surface 706 serves as a pressured surface 708, to which the pressure of the measurement fluid is applied.

In this electrostatic capacitance type pressure sensor using the pressure sensing element 700 as the third prior art example, the space 707 is vacuum sealed, while the pressure of the measurement fluid is acted from the pressured surface 708, thus causing the diaphragm 702 to be flexed. With the flexing of the diaphragm 702 the distance between the electrodes 710 and 711 is changed to change the electrostatic capacitance C of the capacitor 712. This is utilized for detecting the pressure of the measurement fluid.

With this third example of the pressure sensing element 700, in which the base 701 and diaphragm 702 are joined to each other by the high- and low-melting glass spacers 703 and 704, the accuracy of the gap between the base 701 and diaphragm 702 can be secured with the accuracy of printing of the high-melting glass 703. In addition, reliable bond seal can be obtained by printing the low-melting glass 704 after the printing formation of the high-melting glass spacer 703.

With this third example of the pressure sensing element 700, however, a relative humidity increase causes reduction of the creepage surface resistance of ceramics or like material of the base 701 and diaphragm 702 and the high- and low-melting glass as the joining spacer members, thus causing a current leak between the electrodes 710 and 711. In this case, accurate pressure measurement can not be obtained.

Further, since it is necessary to suppress the generation of such a leak current, the distance from the edge of the electrodes 710 and 711 to the high- and low-melting glass spacers 703 and 704 has to be increased to increase the creepage distance of insulation and creepage surface resistance. This leads to a size increase of the pressure sensor or makes it impossible to use large area electrodes. Therefore, the capacitance changes are reduced with the same inter-electrode distance change, making it impossible to obtain accurate measurement.

Referring to FIGS. 19 to 21 again, in the second prior art example of the pressure sensor 800, the electrodes 810 to 812 are led to the outside by connecting leads 826 to 828 extending from them toward outer end portions.

In such electrostatic capacitance type pressure sensing element 800 as the second prior art example, in addition to the case of leading the electrodes to the outer end portions through the leads 826 to 828, there is a case of leading the electrodes to the back of the base (i.e., the surface opposite the surface with the electrodes thereon) by forming through holes in the base and forming conductive portions in the through holes (see Japanese Patent Publication No. S63-9174 and Japanese Utility Model Laid-Open Publication No. S57-105943).

However, in the above second prior art example shown in FIGS. 19 to 21, the electrodes 810 to 812 have to be led out to the outside by providing a portion of the outer edge of each of the electrodes 810 to 812 with each of the conductor paths 816 to 818 extending toward outer end portions and connect the leads 826 to 828 to these conductor paths 816 to 818. Further, the path for leading atmospheric air into the space 806 to provide the reference pressure of the pressure measurement is constituted by a communication hole 819, which is provided quite separately from the structure of leading the electrodes 810 to 812 to the outside. Therefore, the process of manufacture is complicated, and it is impossible to reduce the cost of manufacture.

Further, where the base is provided with through holes for leading electrodes therethrough as noted above, these through holes are used exclusively for the lead-out of the electrodes, and a separate hole has to be provided to secure the path for introducing atmospheric air into the space. Therefore, like the second prior art example shown in FIGS. 19 to 21, the process of manufacture is complicated, and it is impossible to reduce the cost of manufacture.

An object of the invention is to provide a pressure sensor, which permits accurate measurement of the pressure of the measurement fluid and also can be manufactured readily and reliably.

SUMMARY OF THE INVENTION

To attain the above object of the invention, the electrode on the side of the base is formed as a plurality of division electrodes, and the outermost one thereof is imparted with a function of stabilizing the measurement value.

Specifically, the pressure sensor according to the invention comprises:

a base made of a ceramic material and having one surface as a back;

an elastic diaphragm made of a ceramic material and facing and spaced apart a predetermined distance from the surface of the base opposite the back such as to form a pressured surface for acting a measurement fluid thereon;

a base side electrode provided on the base side one of the opposed surfaces of the base and elastic diaphragm, the base side electrode including division electrodes each surrounding the next inner one, the outermost one of the division electrodes serving to stabilize the measurement value;

an elastic diaphragm side electrode provided on the elastic diaphragm one of the opposed surfaces;

a measure circuit for detecting a change in the electrostatic capacitance between the two electrodes caused with a displacement of the elastic diaphragm and thereby obtaining an electric output signal indicative of the pressure value of the measurement fluid;

a base side conductor section for making the measure circuit and the base side electrode conductor with each other; and an elastic diaphragm side conductor section for making the measure circuit and the elastic diaphragm side electrode conductive with each other.

According to the invention as above, the pressure of the measurement fluid is acted on the pressured surface of the elastic diaphragm to cause flexing thereof, and the pressure of the measurement fluid is detected from a change in the electrostatic capacitance caused with a change in the distance between the electrodes facing each other at this time.

The outermost one of the plurality of division electrodes on the base side is imparted with a function of stabilizing the measurement value, and thus the pressure of the measurement fluid can be measured accurately.

More specifically, in the pressure sensor according to the invention the division electrodes on the base side excluding the central one are in a ring-like form, and the outermost one of the division electrodes is grounded or held at a predetermined voltage.

According to the invention as above, the outermost one of the division electrodes on the base side is grounded, for instance, and not used for measurement. Thus, only electric lines of force between the grounded base side division electrode and the elastic diaphragm side electrode are convex outward, and the pertinent electrostatic capacity is influenced by the surrounding materials. On the other hand, the electric lines of force between the remaining base side division electrodes that are used for the measurement and the elastic diaphragm side electrode extend substantially straight, and the pertinent electrostatic capacity is not influenced by the surrounding materials.

Thus, the measurement is not affected by changes in the dielectric constants of the surrounding materials, such as the base, elastic diaphragm and spacer therebetween, that are caused with changes in the temperature and relative humidity of the materials, and thus accurate measurement is obtainable.

Further, such arrangements may be made that two capacitors are formed with the base side division electrodes excluding the outermost one and used for measurement and the elastic diaphragm side electrode and that the measure circuit provides an electric signal related to such ratio as (CR−CM)/(CR+CM), (CR+CM)/(CR−CM), CM/CR, CR/CM, (CR −CM)/CR, (CR−CM)/CM, CR/(CR−CM) or CM/(CR−CM) of the electrostatic capacitances CM and CR of the two capacitors. In this case, the effects of the changes in the dielectric constant of atmospheric air in the space between the base and elastic diaphragm are made up for, and it is possible to obtain a further accurate measurement in addition to the measurement excluding the effects of the surrounding materials due to the grounding noted above.

Further, the plurality of the base side division electrodes except the central one are ring-like and, unlike the first and second prior art examples noted above, have neither outwardly projecting portion nor missing portion. Thus, the influence of the end effect noted above is reduced, thus improving the accuracy of the measurement.

Further, because of such simple shape of electrodes, the process of manufacture can be simplified, thus permitting the above object to be attained.

Further, according to the invention the outermost one of the base side division electrodes is at least partly covered by insulating overcoat glass.

According to the invention as above, with the overcoat glass provided such as to cover at least part of the outermost one of the base side division electrodes, the creepage distance of insulation between the outermost base side division electrode and the diaphragm side electrode is increased to increase the creepage surface resistance between these electrodes.

Thus, as noted above, the leakage current generated between the electrodes facing each other when the relative humidity is increased is suppressed, thus permitting accurate pressure measurement. In addition, it is possible to reduce the distance from the outer edge of the electrode to the joining section between the base and elastic diaphragm, thus permitting size reduction of the pressure sensor or increase of the electrode area.

Further, when covering at least part of the periphery of the outermost division electrode with overcoat glass, part of the inner periphery of the outermost division electrode may be exposed to the space between the base and elastic diaphragm without covering it. Where the outermost division electrode is grounded or held at a predetermined voltage, this arrangement permits the leakage current that flows from the base side electrodes on the inner side of the outermost division electrode to the elastic diaphragm side electrode to be readily absorbed from the exposed part of the outermost division electrode. Further, in addition to covering at least a portion of the outermost one of the plurality of the base side division electrodes with overcoat glass, at least a portion of the electrodes on the inner side of the outermost division electrode may also be covered with overcoat glass. This arrangement permits prevention of the short-circuit between the base side and diaphragm side electrodes due to excessive deformation of the elastic diaphragm. Thus, the above object can be attained.

Further, according to the invention atmospheric air or like fluid providing for the reference pressure for the pressure measurement is introduced into the space defined between the base and elastic diaphragm by utilizing a path formed inside an electrode hole for taking out an electrode to the outside, thus attaining the above object.

According to the invention, there is specifically provided a pressure sensor which comprises:

a base made of a ceramic material and having one surface as a back;

an elastic diaphragm made of a ceramic material and facing and spaced apart a predetermined distance from the surface of the base opposite the back such as to form a pressured surface for acting a measurement fluid thereon;

a base side electrode provided on the base side one of the opposed surfaces of the base and elastic diaphragm;

an elastic diaphragm side electrode provided on the elastic diaphragm side opposed surface;

a measure circuit for detecting a change in the electrostatic capacitance between the two electrodes caused with a displacement of the elastic diaphragm and thereby obtaining an electric output signal indicative of the pressure value of the measurement fluid;

a base side conductor section formed on the wall surface of an electrode hole penetrating the base from the back to the opposed surface thereof, the base side conductor section making the measure circuit and base side electrode conductive with each other, a path being formed within the electrode hole such as to lead atmospheric air or like fluid providing for the reference pressure for pressure measurement into the space defined between the base and the elastic diaphragm; and an elastic diaphragm side conductor section for making the measure circuit and the elastic diaphragm side electrode conductive with each other.

According to the invention as above, atmospheric air or like fluid is led into the space between the base and elastic diaphragm by utilizing the path formed inside the electrode hole for taking out electrode to the outside. Thus, compared to the case of providing the path for leading atmospheric air or like fluid into the space in a separate process, the structure of the pressure sensor is simplified, thus reducing the process of manufacture as well as the cost thereof.

Further, when forming the path for leading atmospheric air or like fluid into the space in the inside of the electrode hole for taking out electrode to the outside, the electrodes and electrode terminals corresponding to the opposite end inlets of the electrode hole may be made of the same material, and the conductor section may be formed by providing the material at each end by vacuum suction from the opposite end of the electrode hole. By so doing, the path for leading atmospheric air or like fluid into the space may be readily secured. In addition, when taking electrode to the outside, reliable conduction is obtainable compared to the case of securing conduction between different materials, in which conduction failure is liable to occur due to a commonly called diffusing phenomenon (i.e., a phenomenon of disappearance of one of the two different materials due to diffusion in the other material). Thus, it is possible to attain the above object.

BRIEF DESCRIPTION OF THE DRAWINGS

FIG. 22 is a sectional view showing a third prior art example.

DETAILED DESCRIPTION OF THE PREFERRED EMBODIMENT(S)

Now, preferred embodiments of the invention will be described with reference to the drawings.

FIGS. 1 to 7 show a pressure sensing element 10 of electrostatic capacitance type as a first embodiment of the invention.

Figure 1:
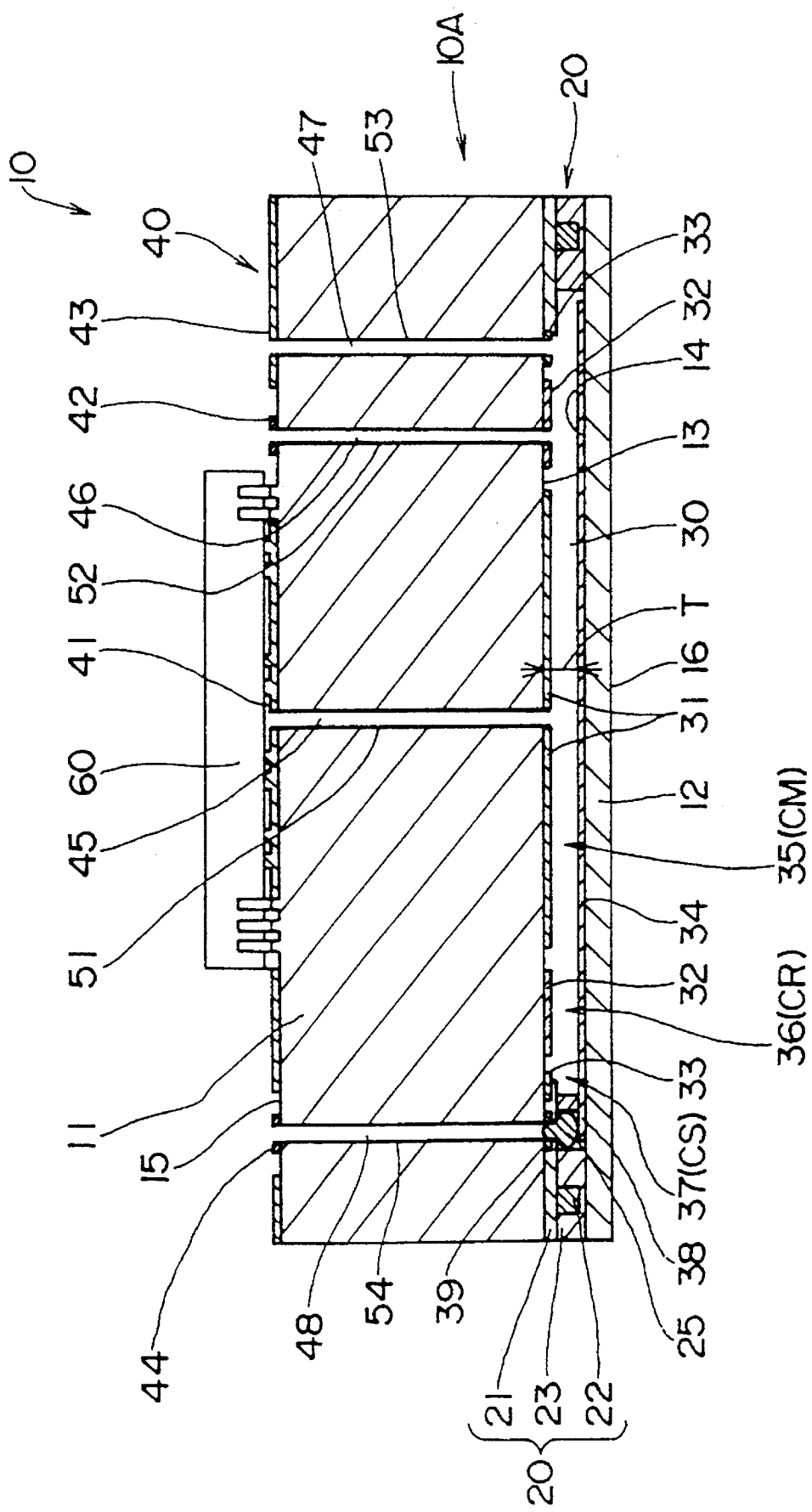
FIG. 1 is a sectional view showing a first embodiment of the invention.

Referring to FIG. 1, the pressure sensing element 10 is mounted inside a pressure sensor (not shown) and converts the pressure of a measurement fluid into an electric output signal for the pressure detection.

The pressure sensing element 10 has a body 10A having a flat cylindrical outer shape. The body 10A includes a thick base 11 made of a ceramic material and a thin diaphragm 12 made of a ceramic material and deformable by the pressure of measurement fluid. The base 11 and diaphragm 12 extend parallel and is spaced apart a predetermined distance by a spacer 20 serving as a joining section. Opposed surfaces 13 and 14 of the base 11 and diaphragm 12 define a space 30 between them such as to be surrounded by the spacer 20 which is ring-like in shape.

On the opposed surface 13 of the base 11 are provided with three electrodes, i.e., a solid circular central electrode 31 without any central missing portion, and a reference and a shield electrode 32 and 33, which are ring-like in shape. On the opposed surface 14 of the diaphragm 12, a solid circular common electrode 34 is provided.

Figure 2:
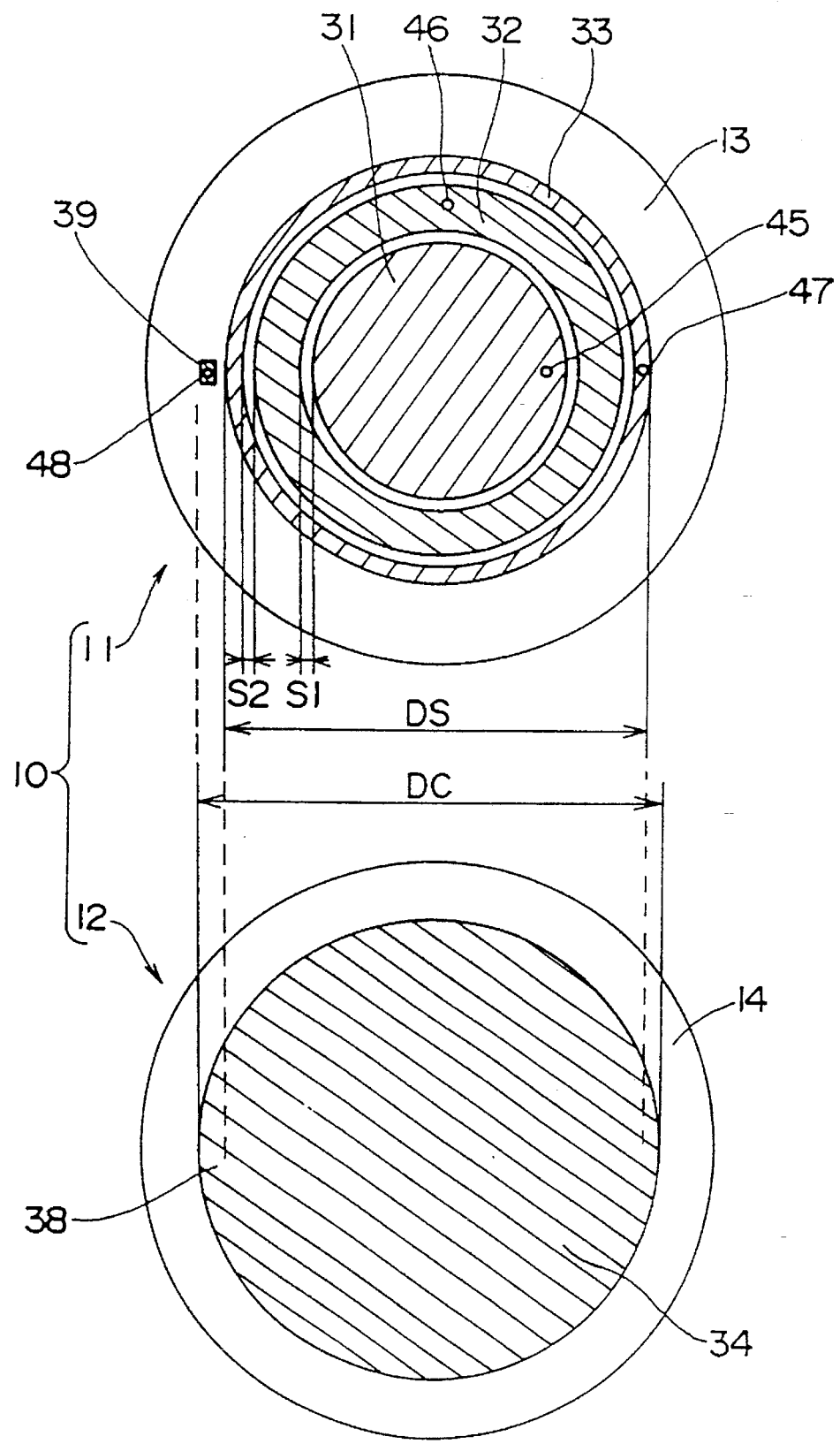
FIG. 2 is a disassembled view showing the first embodiment.

FIG. 2 shows the base 11 and diaphragm 12 viewed from the side of their opposed surfaces 13 and 14 (it being assumed that the spacer 20 is not formed). The shaded portions in the Figure do not show any section but are shown to facilitate the description. This also applies to the shaded portions in FIGS. 3 and 10 to be described later.

On the opposed surface 13 of the base 11, the central electrode 31 is formed in a solid circular form, the reference electrode 32 is formed in a ring-Like form such as to enclose the central electrode 31, and the shield electrode 33 is formed also in a ring-like form such as to enclose the reference electrode 32. The distance S1 between the central and reference electrodes 31 and 32 and also the distance S2 between the reference and shield electrodes 32 and 33 are about 500 µm.

On the opposed surface 14 of the diaphragm 12, the common electrode 34 is formed in a solid circular form. Its outer diameter DC is made to be greater than the outer diameter DS of the shield electrode 33. The portion of the common electrode 34 on the outer side of the outer edge of the shield electrode 33 constitutes an outer edge portion 38 for electrode terminal formation to be described later.

On the outer side of the shield electrode 33 on the opposed surface 13 of the base 11, a connection terminal 39 which is to be made conductive with the outer edge portion 38 of the common electrode 34 is formed. It is made of sliver palladium paste or like conductive material.

Referring back to FIG. 1, the electrodes noted above form three capacitors with atmospheric air in the space 30 as the dielectric. Specifically, the central and common electrodes 31 and 34 form a capacitor 35 with electrostatic capacitance CM, the reference and common electrodes 32 and 34 form a capacitor 36 with electrostatic capacitance CR, and shield and common electrodes 33 and 34 form a capacitor 37 with electrostatic capacitance CS. The inter-electrode distance T of each of the capacitors 35 to 37 is determined by the thickness of the spacer 20 and is about 50 µm, for instance, in the state of absence of pressure acting on the diaphragm 12.

The surface of the diaphragm 12 opposite the opposed surface 14 is a pressured surface 16, to which the pressure of measurement fluid is applied. The pressure sensing element 10 is adapted to detect the pressure of the measurement fluid by making use of changes in the electrostatic capacitances CM, CR and CS caused by changes in the inter-electrode distances of the capacitors 35 to 37 from the initial value T as a result of the flexing of the diaphragm 12 which is caused by the pressure difference between the pressure of the measurement fluid acting on the pressured surface 16 of the diaphragm 12 and the atmospheric pressure in the space 30.

On the back 15 of the base 11 (i.e., on the surface opposite the opposed surface 13), a one-chip IC 60 is mounted. The one-chip IC 60, as will be described later in detail, is a C-MOS ASIC (custom IC) which includes a build-in measure circuit (see FIG. 6 to be described later) for measuring the changes in the electrostatic capacitances CM, CR and CS. Further, on the back 15 of the base 11, an electrode pattern 40 for directly mounting the one-chip IC 60 thereon is formed by printing.

Figure 3:
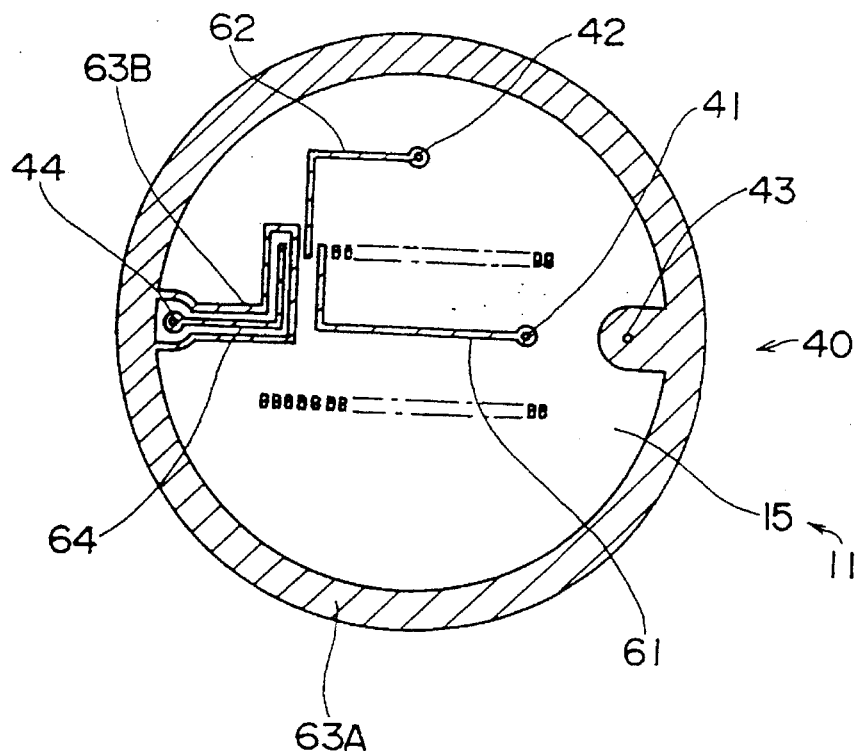
FIG. 3 is a view showing an electrode pattern on the back of a base in the first embodiment before mounting a one-chip IC.
Figure 4:
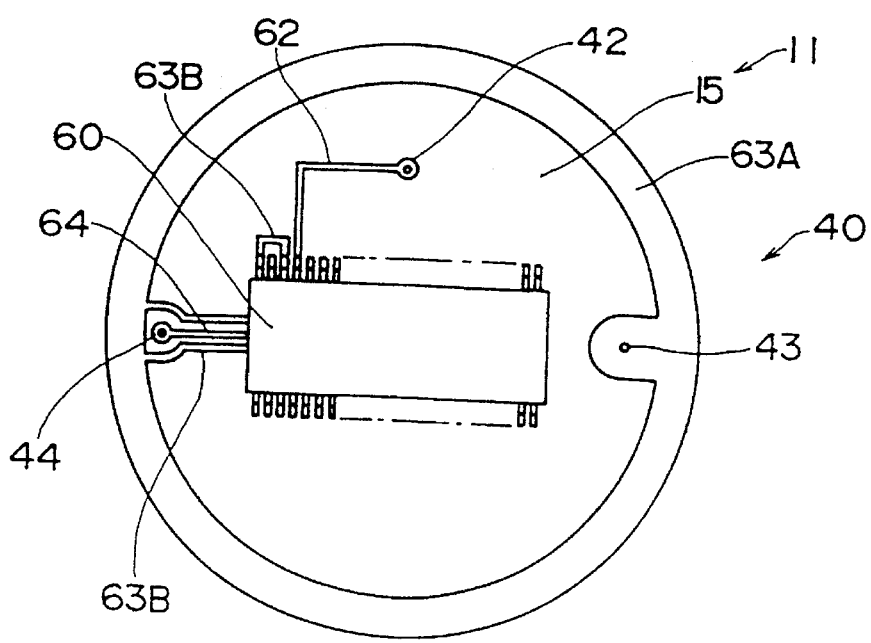
FIG. 4 is a view showing the electrode pattern on the back of the base in the first embodiment after mounting the one-chip IC.

FIGS. 3 and 4 show the detailed structure of the electrode pattern 40. FIG. 3 shows the state before mounting the one-chip IC 60, and FIG. 4 shows the state after mounting the one-chip IC 60.

The electrode pattern 40 has a ring-like circuit path 63A formed on an outer edge portion of the back 15 of the base 11. The circuit path 63A has an inner projection projecting from a right portion in the drawing, and an electrode terminal 43 for the shield electrode 33 on the side of the base 11 is formed such that it is made electrically conductive with the inner projection noted above.

Inside the circuit path 63A, electrode terminals 41 and 42 for the central and reference electrodes 31 and 32 on the side of the base 11 and an electrode terminal 44 for the common electrode 34 on the side of the diaphragm 12 are formed in the form of spots. Circuit paths 61, 62 and 64 are formed in the form of keys such that they extend from the respective electrode terminals 41, 42 and 44. Their other ends are led to the positions of pins of the one-chip IC 60.

In this case, a circuit path 63B is formed such that it surrounds and is spaced apart a predetermined distance from the electrode terminal 44 for the common electrode 34 and the circuit path 64. The circuit path 63B is connected to and made integral with the inner side of a left side portion of the ring-like circuit path 63A. The circuit path 63B is arranged such as to pass the positions of pins of the one-chip IC 60 that are located on the opposite sides of the free end of the circuit path 64, and it is connected to a grounding terminal of the one-chip IC 60. The circuit paths 63A and 63B, which are made conductive with the electrode terminal 43 for the shield electrode 33, are grounded.

Thus, the circuit paths 61 and 62 that include the respective electrode terminals 41 and 42 for the central and reference electrodes 31 and 32, are isolated from the circuit path 64 including the electrode terminal 44 for the common electrode 34 by the circuit paths 63A and 63B which serve as grounding electrodes. This arrangement permits reduction of the influence of leak current increase due to the reduction of the insulation resistance between the two.

The electrode terminals 41 to 44, as shown in FIG. 1, is made conductive with a connection terminal 39, which is made conductive with the central, reference, shield and common electrodes 31 to 34 through conductor sections 51 to 54 which are formed in electrode holes 45 to 48 penetrating the base 11.

The conductor sections 51 to 54 are formed in the wall surfaces of the electrode holes 45 to 48 such that through holes are formed centrally of the holes. Of these through holes, the through hole in the electrode hole 48 is closed by conductive paste 25 to be described later. At least one of the through holes in the remaining electrode holes 45 to 47 is opened at both ends and thus permits introduction of atmospheric air into the space 30.

Figure 5:
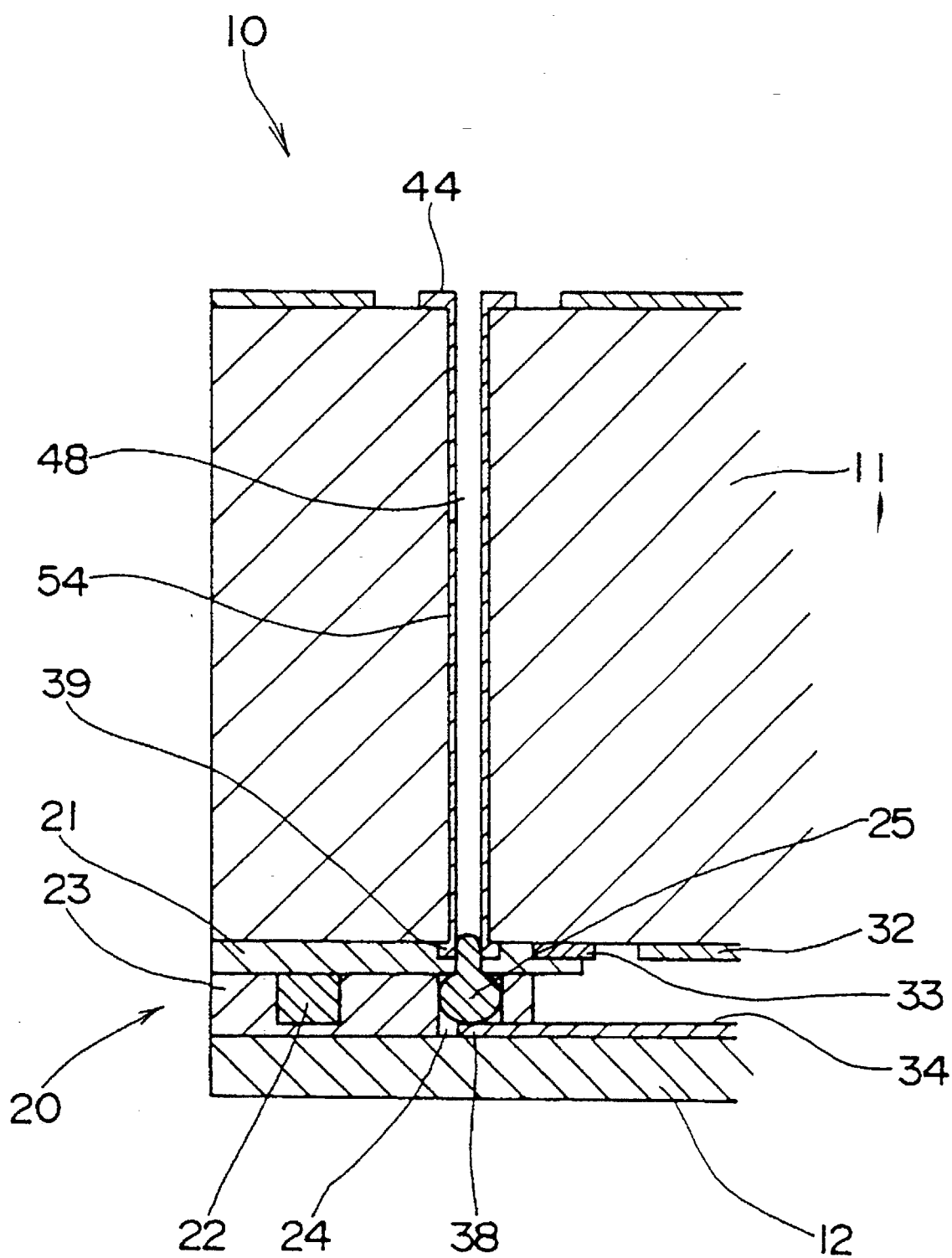
FIG. 5 is a fragmentary sectional view showing an essential part of the first embodiment.

FIG. 5 shows the spacer 20 in a detailed sectional view.

The spacer 20 includes an overcoat glass part 21, which is in close contact with the side of the base 11 such as to cover the outer periphery of the shield electrode 33, a ring-like high-melting glass part 22, which is provided as a gap adjustment spacer for adjusting the gap between the overcoat glass part 21 and diaphragm 12, and a low-melting glass part 23, which is provided between the overcoat glass part 21 and diaphragm 12 and on the inner and outer peripheries of the high-melting glass part 22.

The overcoat glass 21 is provided to increase the creepage distance of insulation between the shield and common electrodes 33 and 34 so as to increase the creepage surface resistance.

The high-melting glass 22 is crystallized glass or the like, and it is provided to hold the distance between the base 11 and diaphragm 12, i.e., the inter-electrode distance T, to a predetermined distance by adjusting its thickness. The pressure range is usually changed by changing the thickness of the diaphragm 12, but it may also be changed by changing the inter-electrode distance T by adjusting the thickness of the high-melting glass part 22.

The low-melting glass part 23 is non-crystallized glass or the like, and it defines a local space 24, in which is inserted a conductive paste 25 for making the outer edge portion 38 of the common electrode 34 and the connection terminal 39 conductive with each other. The space 24 is partitioned with respect to the space 30 by the low-melting glass part 23 in order to prevent getting-out when inserting the conductive paste 25 in a process of manufacture to be described later. The common electrode 34 is made conductive from the outer edge portion 38 via the conductive paste 25, connection terminal 39 and conductor section 54 in the mentioned order to the electrode terminal 44 on the back 15 of the base 11. The overcoat glass part 21 is formed at a corresponding position with a space 24, in which conductive paste 25 is inserted. Depending on the arrangement of the high-melting glass part 22, the space 24 may be formed in the high-melting glass part 22.

Figure 6:
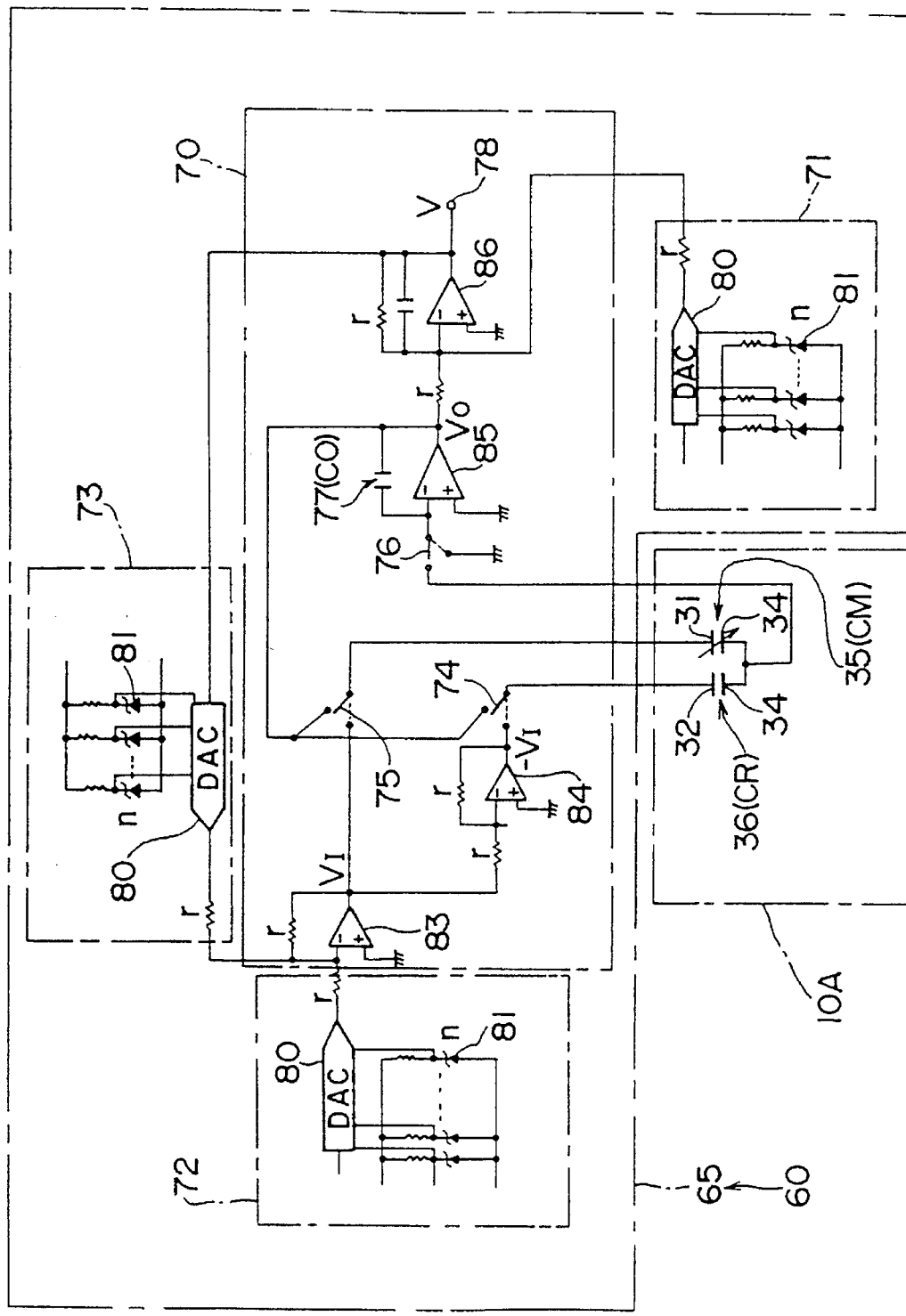
FIG. 6 is a circuit diagram showing a measure circuit in the first embodiment.

FIG. 6 shows a measure circuit 65 which is constructed within the one-chip IC 60.

Referring to FIG. 6, the measure circuit 65 includes a circuit 70 as circuit means for obtaining an output signal, which is related to the ratio between the sum of and difference between the electrostatic capacitances CM and CR of the capacitors 35 and 36 in the body 10A of the pressure sensing element 10 as will be described later in detail. In addition, it further includes a zero point adjustment circuit 71 as zero point adjusting means for adjusting the zero point of the output signal of the measure circuit 65, a span adjustment circuit 72 as span adjusting means for adjusting the magnitude relationship (or span) between the input side pressure range and output side output signal range in the relation between the pressure of the measurement fluid applied to the diaphragm 12 of the body 10A and the corresponding output signal of the measure circuit 65, and a linearity correction circuit 73 as linearity correcting means for correcting the linearity of the relation between the input applied pressure and the corresponding output signal.

The circuit 70 has an operational amplifier 83, to the minus terminal of which are input the output signals of the span adjustment and linearity correction circuits 72 and 73. The operational amplifier 83 has its output side directly connected to one terminal of a switch 75 and also connected via an operational amplifier 84 to one terminal of a switch 74. The switches 75 and 74 have their common terminals connected, respectively, to the central and reference electrodes 31 and 32 each as one of the electrodes of each of the capacitors 35 and 36.

The common electrode 34, which is the other electrode of each of the capacitors 35 and 36, is connected to a switch 76 to the minus terminal of the operational amplifier 85, the output side of which is connected commonly to the other terminal of each of the switches 75 and 74 and also connected to the minus terminal of an operational amplifier 86. A capacitor 77 with electrostatic capacitance C0 for data holding (to be described later in detail) is connected between the output side and minus terminal of the operational amplifier 85. TTo the minus terminal of the operational amplifier 86 is input the output signal of the zero point adjustment circuit 71, and the operational amplifier 86 has its output side connected to an output terminal 78 for feeding back its output signal to the linearity correction circuit 73.

The operational amplifiers 83 to 86 each have their plus terminal grounded.

The zero point adjustment, span adjustment and linearity correction circuits 71 to 73 each have a plurality of zener diodes 81 (n zener diodes being shown in FIG. 6) which are connected in parallel to each digital-to-analog converter (DAC) 80. Of the plurality of zener diodes a necessary number thereof are trimmed to permit adjustment of the output signal corresponding to each function.

In FIG. 6, the circuit 70 has three switches 74 to 76, which can be switched between the dashed and solid line states.

When the switches 74 to 76 are in the dashed line state, the output voltage VI of the operational amplifier 83 and the output voltage −VI of the operational amplifier 84 are applied to the capacitors 35 and 36 in the body 10A, whereby charges QM and QR corresponding to the electrostatic capacitances CM and CR are stored according to $$QM = -CM \times VI \text{ and } QR = CR \times VI$$

As a specific example of the voltage and electrostatic capacitances, the voltage VI is about 2.5 V (2×VI=5 V), and the electrostatic capacitances CM and CR is 30 pF, for instance. With the flexing of the diaphragm 12, the electrostatic capacitance CM of the capacitor 35 usually is changed by 6 to 8 pF, while the electrostatic capacitance CR of the capacitor 36 is changed by 1 to 2 pF. The difference between the two electrostatic capacitances thus becomes 5 to 6 pF.

When the switches 74 to 76 are in the solid line state, the difference ΔQ between the charges QM and QR stored in the capacitors 35 ad 36 is transferred to the capacitor 77 with electrostatic capacitance C0. Assuming QR>QM, the voltage VX across each of the capacitors 35 and 36 is balanced to be $$VX = (QR - \Delta Q)/CR = (QM + \Delta Q)/CM$$

Thus, we can obtain $$\Delta Q = (CM \times QR - CR \times QM)/(CR + CM)$$

Thus, with the transfer of the charge ΔQ, the output voltage V0 of the operational amplifier 85 becomes $$\begin{aligned} VO &= VX \\ &= (QR - \Delta Q)/CR \\ &= [CR \times VI - \{(CM \times QR - CR \times QM)/(CR + CM)\}]/CR \\ &= [CR \times VI - \{(CM \times CR \times VI + CR \times CM \times VI)/(CR + CM)\}]/CR \\ &= \{(CR - CM)/(CR + CM)\} \times VI. \end{aligned}$$

It is thus possible to obtain an output signal which is related to the ratio between the sum of and the difference between the electrostatic capacitances CM and CR of the capacitors 35 and 36.

In this first embodiment, the pressure of the measurement fluid is detected as follows.

First, the pressure of the measurement fluid is acted on the pressured surface 16 of the diaphragm 12, and at the same time atmospheric air is led into the space through at least one of the through holes formed in the electrode holes 45 to 47, thus providing the atmospheric pressure in the space 30. At this time, the diaphragm 12 is flexed by the differential pressure between the side of the pressured surface 16 and the side of the space 30. Usually, the flexing is caused to the side of the space 30, but it is caused to the opposite side if the pressure of the measurement fluid is negative (i.e., lower than the atmospheric pressure).

The measure circuit 65 detects the changes in the electrostatic capacitances CM and CR with changes in the inter-electrode distances of the capacitors 35 and 36 caused with the flexing of the diaphragm 12 and thus provides an output signal which is related to the ratio between the sum of and the difference between the electrostatic capacitances CM and CR of the capacitors 35 and 36.

Preliminary, calibration or the like is made on the relationship between the output signal and the pressure, and by so doing the pressure of the measurement fluid corresponding to the detected output signal can be obtained.

Now, an example of the method of manufacturing the pressure sensing element 10 in the first embodiment will be described.

First, in step (1) the base 11 and diaphragm 12 are made by press molding of a suitable material, for instance, alumina ceramics. Alumina ($Al_2O_3$) is a typical fine ceramic material. It is high melting, hard and excellent in the electric insulation. The thickness of the base 11 is usually about 4 mm. The thickness of the diaphragm varies with such factor as the relationship between the pressure range of the measure to be measured and the effective diameter of the diaphragm 12, but is usually 0.2 to 1.0 mm.

Then, in step (2) the individual electrodes and spacer 20 are printed on the base 11 and diaphragm 12 and then baked. The printing and baking may all be made by using hybrid IC (HIC) manufacture techniques and machines.

Then, in step (2A) the three electrodes, i.e., the central, reference and shield electrodes 31 to 33, and the connection terminal 39, are screen printed in an arrangement as shown in FIG. 2 on the front surface (i.e., opposed surface 13) of the base 11. The printing material is silver palladium paste or the like. The baking is carried out in a continuous furnace at a temperature of 700 to 900 degrees. The baking thickness is 5 to 10 µm.

In operation, the individual electrode holes 45 to 48 are held sucked by utilizing the vacuum of vacuum chucks, and silver palladium paste for printing is charged into the electrode holes 45 to 48 such that it proceeds along the wall surfaces of the holes.

Then, in step (2B) the electrode pattern 40 including the electrode terminals 41 to 44 are screen printed in an arrangement as shown in FIG. 3 on the back surface (i.e., back 15) of the base 11. The printing material is the same silver palladium paste as in the step (2A), and also the method and thickness of baking are the same as in the step (2A).

Figure 7:
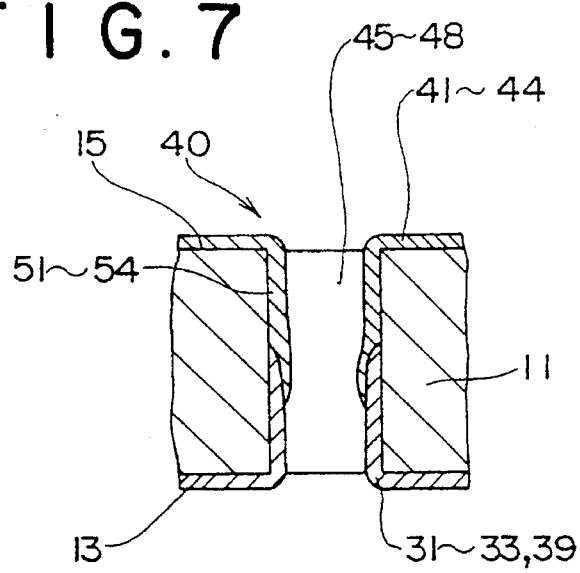
FIG. 7 is a fragmentary sectional view showing a different essential part of the first embodiment.

Again as in the step (2A), the individual electrode holes 45 to 48 are held sucked by utilizing the vacuum of the vacuum chucks, and the silver palladium paste in printing is charged into the electrode holes 45 to 48 such that it proceeds along the wall surfaces of the holes. By charging of the paste by vacuum suction from the side of the opposed surface 13 and also from the side of the back 15, as shown in the section of FIG. 7, conductor sections 51 to 54 are formed on the wall surfaces of the electrode holes 45 to 48, and also through holes are formed centrally of the conductor sections 51 to 54. Of the through holes formed in the electrode holes 45 to 48, that which is formed in the electrode hole 48 for the common electrode 34 has one end inlet closed by the conductive paste 25 which is inserted in a later step (4) (see FIG. 5). At least one of the through holes in the other electrode holes 45 to 47 for the central, reference and shield electrodes 31 to 33, has the opposite end inlets held open to serve as a low pressure ports for leading atmospheric air into the space 30.

In a subsequent step (2C), the overcoat glass 21 is printed in an arrangement as shown in FIGS. 1 to 5 on the opposed surface 13 of the base 11. The printing material used is passivation glass or the like. The baking is carried out in a continuous furnace at a temperature of 700 to 900 degrees. The baking thickness is 20 to 28 µm.

In a subsequent step (2D), high-melting glass 22 serving as a spacer is printed in an arrangement as shown in FIGS. 1 and 5 on the overcoat glass 21. The printing material is glass paste. The baking is carried out in a continuous furnace at a temperature of 700 to 900 degrees. The baking thickness is 20 to 50 µm, and it varies with the measurement range of the pressure sensor.

In a subsequent step (2E), low-melting glass 23 for joining is printed on the overcoat glass 21 in such an arrangement as to enclose the inner and outer sides of the high-melting glass 22 having been printed in the step (2D), that is, in an arrangement such as to stride the high-melting glass 22 (i.e., arrangement as shown in FIGS. 1 and 5), and then it is dried. At this time, the printing is done using a mask such as to form the space 24 corresponding to the electrode hole 48. The printing material is glass paste. The dry thickness is 20 to 50 µm, and it varies with the measurement range of the pressure sensor.

Meanwhile, in a step (2F) the circular common electrode 34 as shown in FIG. 2 is printed on the opposed surface 14 of the diaphragm 12. The printing material is gold resinate, for instance. The baking is carried out in a continuous furnace at a temperature of 700 to 900 degrees. The baking thickness is 0.5 to 1.0 µm.

In subsequent step (2G), the same material as the low-melting glass 23 for joining, having been printed in the step (2E), in an arrangement as shown in FIGS. 1 to 5 on the opposed surface 14 of the diaphragm 12, and then dried. The dry thickness is 20 to 50 µm, and it varies with the measurement range of the pressure sensor. With the low-melting glass 23, with the baking in the next step (3) the thickness after the baking is greatly reduced compared to the dry thickness. Therefore, the printing is carried out by taking this reduction into considerations.

In some cases, the printing of the low-melting glass 23 in either of the steps (2E) and (2G) may be omitted, that is, the low-melting glass 23 may be printed on either side of the base 11 or diaphragm 12 for joining together these parts. In general, the low-melting glass 23 is printed on at least either side such that the sectional arrangement as shown in FIG. 5 is obtained after the baking in the step (3).

In the step (3), the base 11 and diaphragm 12 are joined together by overlapping them such that their opposed surfaces 13 and 14 face each other and baking the low-melting glass 23. The baking temperature is 600 to 700 degrees.

Then, in a step (4) the conductive paste 25 (see FIG. 5), attached to the end of a thin linear member or the like, is inserted into the space 24 through the through hole formed in the electrode hole 48 and then sintered, thus making the common electrode 34 ad the electrode terminal 44 provided on the back 15 of the base 11 conductive with each other. The baking is usually carried out at a temperature of 600 degrees or below.

Finally, in a step (5) a pin for connecting the measure circuit 65 provided within the one-chip IC 60, is erected by soldering in a portion of the back 15 of the base 11 in which one end of each of the circuit paths 61 to 64 is concentrated, i.e., a portion corresponding to the pins of the one-chip IC 60, and the one-chip IC 60 is mounted on this portion.

With the above first embodiment, the following effects are obtainable.

Since the three division electrodes, i.e., the central, reference and shield electrodes 31 to 33, are provided on the side of the base 11, it is possible that the influences of the ceramic material of the base 11 in the neighborhood of the spacer 20 and also low-melting glass 23 as the material of the spacer 20, are received only by the capacitor 37 (with electrostatic capacitance CS) on the side of the spacer 20 and are not received by the inner capacitors 35 and 36 (with electrostatic capacitances CM and CR). Specifically, because of the presence of the spacer 20 the electric lines of force connecting the shield and common electrodes 33 and 34 are formed such that they are convex outward, so that the electrostatic capacitance CS is affected by changes in the dielectric constants of the ceramic material and low-melting glass 23 caused with relative humidity changes. On the other hand, the electric lines of force connecting the central and reference electrodes 31 to 32 and the common electrode 34 are formed normally such that they extend substantially straight through the space 30, and the electrostatic capacitances CM and CR receive influences of only the dielectric constant of atmospheric air in the space 30.

Thus, by using the shield electrode 33 on the outermost side, i.e., on the side of the spacer 20, for the grounding and not for the measurement and using the inner central and reference electrodes 31 and 32 for the measurement, it is possible to obtain accurate measurement free from the influences of the ceramic material and low-melting glass 23 noted above.

Further, as shown in FIG. 6 the circuit 70 provides a voltage V from its output terminal 78 such that $$V \propto V0 = \{(CR-CM)/(CR+CM)\} \times VI$$

that is, it is possible to obtain an output signal related to the ratio between the sum of and the difference between the electrostatic capacitances CM and CR of the capacitors 35 and 36. Thus, even when the electrostatic capacitances CM and CR are changed with changes in the dielectric constant of atmospheric air in the space 30 that are caused by the influences of the temperature, relative humidity, etc., it is possible to make up for the changes. The accuracy of measurement, thus can be further improved in addition to the effects of provision of the shield electrode 33 noted above.

Denoting the electrode areas by AM and AR, the inter-electrode distances by DM and DR and changes therein by DMP and DRP(DMP>DRP), the electrostatic capacitances CM and CR are given as $$CM = \epsilon \times AM/(DM-DMP)$$

and $$CR = \epsilon \times AR/(DR-DRP).$$

Since the voltage V from the output terminal 78 is given as the ratio between the sum of and the difference between the electrostatic capacitances CM and CR, a change in the dielectric constant $\epsilon$ that may be caused by the influences of the temperature, relative humidity, etc. of atmospheric air in the space 30, may be canceled.

Further, since the central electrode 31 is formed to be circular while the reference and shield electrodes 32 and 33 are formed to be ring-like, the manufacture can be facilitated.

Further, since the common electrode 34 is formed to be circular, the operation of joining together the base 11 and diaphragm 12 can be carried out without taking the directivity of the electrode into considerations. It is thus possible to facilitate the manufacture.

Further, since the outer edge portion 38 of the circular common electrode 34 is found on the outer side of the outer edge of the outermost shield electrode 33 on the side of the base 11, the leading of the electrode terminal 44 for the common electrode 34 to the back 15 of the base 11 can be readily realized.

Further, owing to the provision of the shield electrode 33, when the creepage surface resistance of the ceramic material of the base 11 and the low-melting glass 23 of the spacer 20 is reduced, the leak current that may flow from the reference electrode 32 to the common electrode 34 may be absorbed by the shield electrode 33. Since the shield electrode 33 is not used for the measurement, its provision has the effect of reducing the influence of the relative humidity on the measurement.

Further, since the spacer 20 has the high-melting glass part 22 serving as a spacer and the low-melting glass 23 surrounding, for joining, the high-melting glass part, it is possible to set the base 11 and diaphragm 12 to be parallel and spaced apart a predetermined distance, i.e., set inter-electrode distance T to a predetermined value, by adjusting the thickness of the high-melting glass part 22.

Further, the spacer 2 has the overcoat glass part 21, which can increase the creepage distance of insulation between the shield and common electrodes 33 and 34 to increase the creepage surface resistance, and thus it is possible to reduce the leakage current between these electrodes.

Further, the overcoat glass 21 may be printed such as to cover not only part of the shield electrode 33 but also the central and reference electrodes 31 and 32. By so doing, it is possible to prevent the short-circuit of these electrodes to the common electrode 34 in the event of excessive deformation of the diaphragm 12.

Further, the overcoat glass part 21 covers part of the shield electrode 33, and its portion on the side of the reference electrode 32 is directly exposed to atmospheric air in the space 30. Thus, a leakage current that may be generated from the reference electrode 32 may be readily absorbed. It is thus possible to improve the effect of prevention of leakage current from the reference electrode 32 to the common electrode 34 along the edge surface of the spacer 20 owing to the shield electrode 33.

Further, since the low-melting and overcoat glass parts 23 and 21 are preliminary provided with the space 24, it is possible to prevent the conductive paste 25 for taking out the common electrode 34 to the outside from getting into the space 30 when inserting it.

Further, in the electrode pattern 40 provided on the back 15 of the base 11, the circuit paths 63A and 63B which are made conductive with the electrode terminal 43 of the shield electrode 33, are arranged to enclose the circuit path 64 including the electrode terminal 44 for the common electrode 34, and the circuit paths 61 and 62 including the electrode terminals 41 and 42 for the central and reference electrodes 31 and 32, on one hand, and the circuit path 64 including the electrode terminal 44 for the common terminal 34, on the other hand, are isolated from one another by the circuit paths 63A and 63B as grounding electrodes.

Thus, a leakage current that may flow from the side of the circuit paths 61 and 62 for the central and reference electrodes 31 and 32 to the side of the circuit path 64 for the common electrode 34 with an increase of the relative humidity of atmosphere touching the electrode pattern 40, can be absorbed by the circuit paths 63A and 63B for the shield electrode 33, thus permitting accurate measurement.

Further, the above arrangement of the electrode pattern 40 can reduce the influence of changes in the relative humidity of atmosphere, and thus it is possible to avoid such inconvenience as increase of the pressure sensor for obtaining as large electrostatic capacitance changes as that the influence of the leakage current can be ignored as in the prior art.

Further, unlike the prior art, there is no need of sealing atmospheric air touching the electrode pattern 40 for reducing the influence of the relative humidity changes. Thus, it is possible to reduce the sealing parts and sealing processes, thus permitting cost reduction. Further, no space for sealing is necessary, which is desired for reducing the size of the pressure sensor.

Further, by the provision of the commonly termed potting, i.e., a process of closing the end inlets of the through holes formed as low pressure port in the electrode holes 45 to 47 except for the end inlets of at least one of these through holes by dropping fused resin or the like onto the back 15 of the base 11 such as to cover the electrode pattern 40, it is possible to permit use while withstanding hard environments. As the potting material may be used polyurethane resin or the like.

With the above arrangement of the electrode pattern 40 it is possible to reduce the influence of external disturbances as noted above, and thus it is possible to detect a very weak current. Further, it is possible to increase the sensitivity of amplification of the amplifier element and make the pressure sensing element 10 of a very small capacity, thus permitting the size reduction of the pressure sensor.

Further, the paths (low pressure ports) for leading atmospheric air to the space 30 to provide the reference pressure for the measurement are secured by making use of the through holes formed in the electrode holes 45 to 47. This means that the low pressure ports can be secured in the sole steps (2A) and (2B) for making the electrode pattern 40 on the side of the back 15 of the base 11 and the division electrodes on the side of the opposed surface 13 conductive with one another, that is, it is possible to omit any separate step for the formation of the low pressure ports.

Further, the measure circuit 65 is entirely accommodated in the one-chip IC 60, which is directly mounted on the electrode pattern 40 on the back 15 of the base 11. Thus, compared to the case of mounting a measure circuit comprising a large number of parts on a printed base or like separate member as in the prior art example, it is possible to reduce the constituent parts of the measure circuit and omit the printed base or like member on which to mount these parts. It is thus possible to reduce the number of parts.

Thus, with the reduction of the component parts of the measure circuit and the omission of the step of mounting the printed base or the like, the process of manufacture can be simplified. In addition, there is no need of providing the installation space of the printed base or the like, and thus it is possible to reduce the size of the pressure sensor.

Further, the electrode pattern 40 on the side of the back 15 of the base 11 and the central, reference and shield electrodes 31 to 33 and connection terminal 39 on the side of the opposed surface 13, are printed with low viscosity and silver palladium paste capable of being satisfactorily elongated. Thus, they can be reliably made conductive. Usually, conduction is made with gold resinate and silver palladium paste. In this case, because of the conduction between the different materials and small thickness of the gold resinate after the baking. In this case, where the different materials are in contact with each other a phenomenon of diffusion of the gold resinate as one of the two materials, that is, disappearance of the gold resinate with diffusion in the silver palladium paste as the other material, may occur to result in conduction failure. In this embodiment, this can be prevented.

Further, where the through hole treatment of the electrode holes 45 to 48 is done by using gold resinate for printing the electrode pattern 40 on the side of the back 15 of the base 11 and the central, reference and shield electrodes 31 to 33 and connection terminal 39 on the side of the opposed surface 13, the gold resinate is thinly finished to result in an extremely small printed amount of the conductor sections 51 to 54. Therefore, imperfect conduction is liable. With the through hole treatment using silver palladium paste for both sides as in this embodiment, more reliable conduction is obtainable.

Figure 8:
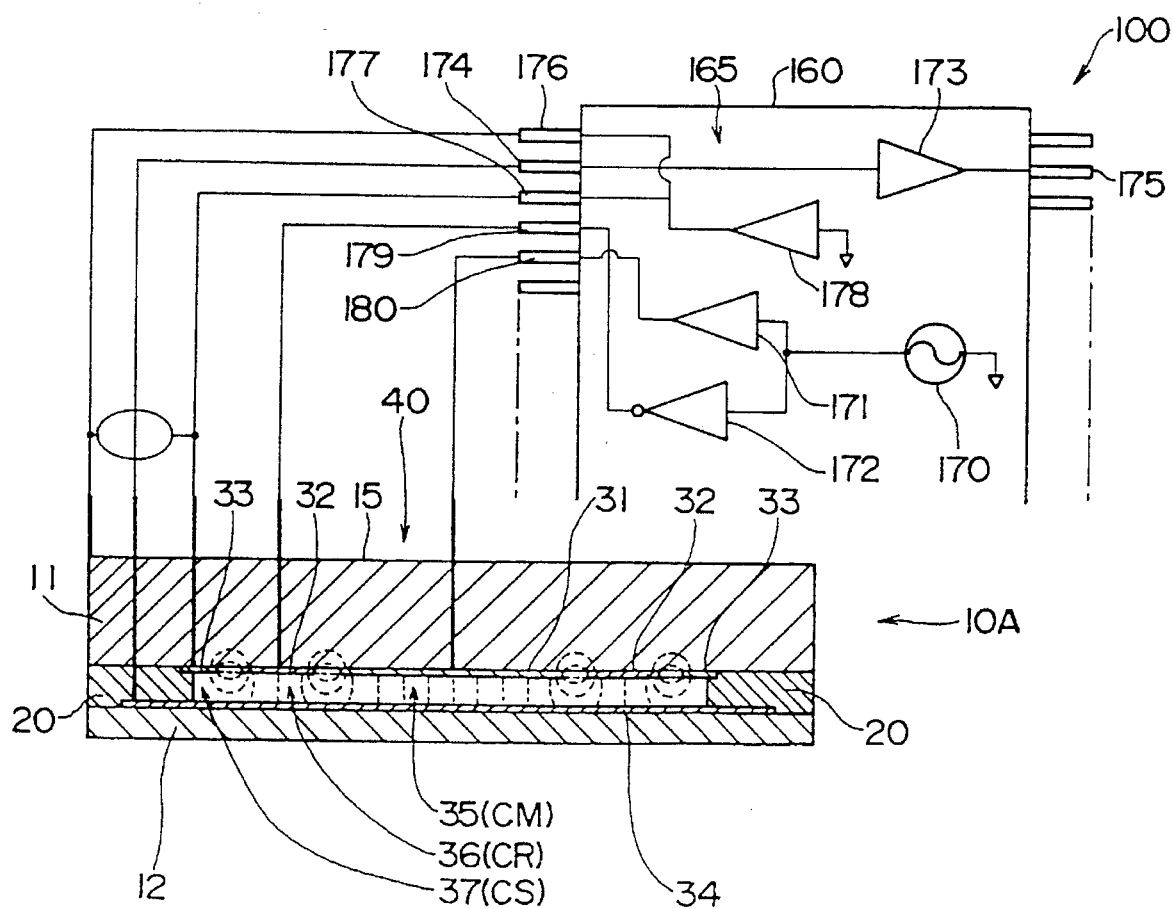
FIG. 8 is a circuit diagram showing a second embodiment of the invention.
Figure 9:
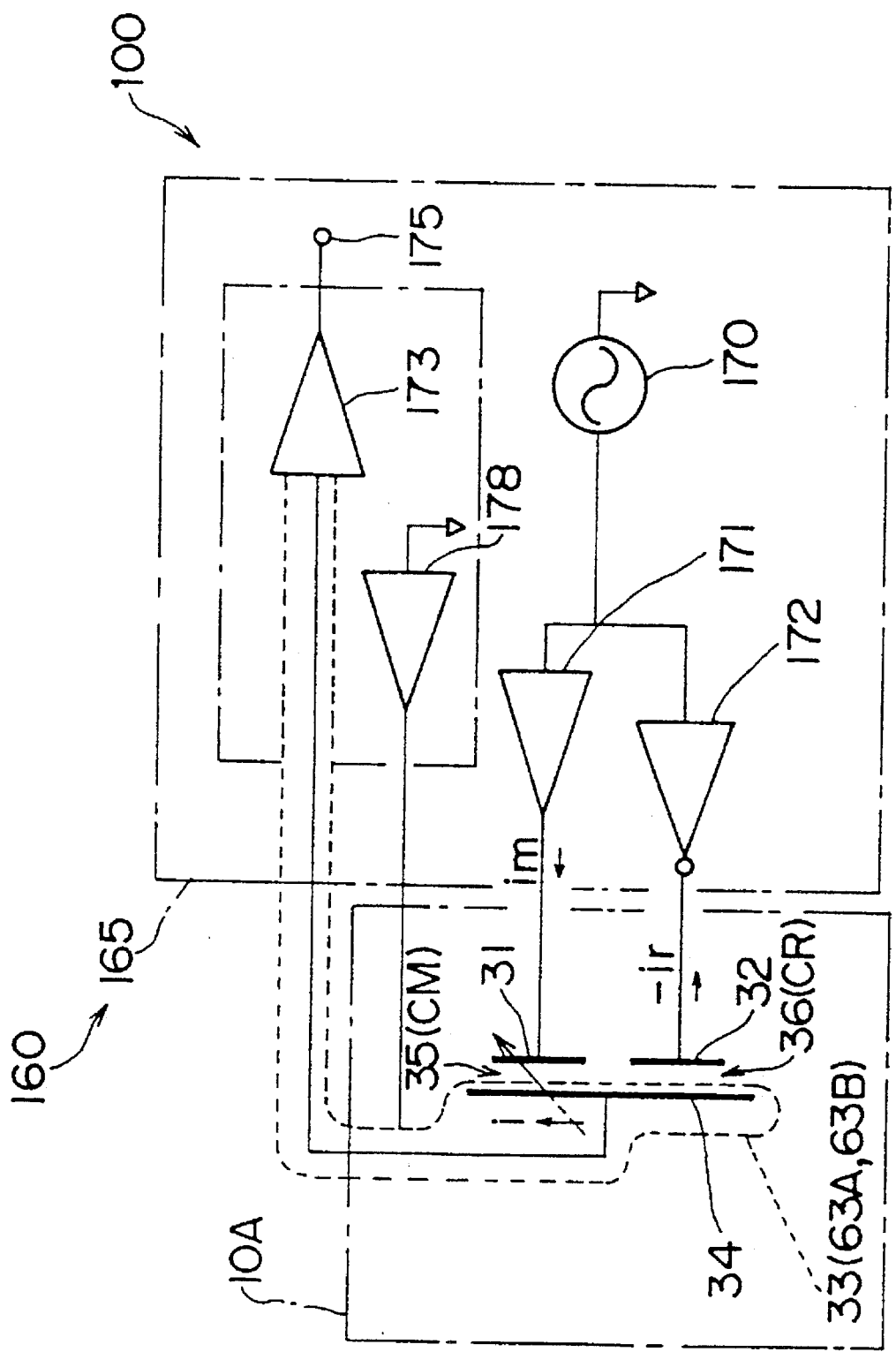
FIG. 9 is a view for explaining a measure circuit in the second embodiment.

FIGS. 8 and 9 show pressure sensing element 100 of electrostatic capacitance type in a second embodiment of the invention.

This pressure sensing element 100, except the measure circuit build in the one-chip IC, is substantially the same in the structure and functions as the preceding first embodiment, and also the method of manufacture is the same. Thus, like parts are designated by like reference numerals and are not described in detail, and only the different parts will be described.

FIG. 8 shows the status of connection between the body 10A of the pressure sensing element 100 and a measure circuit 165 for measuring the changes in the electrostatic capacitances CM, CR and CS of capacitors 35 to 37 formed in the body 10A. FIG. 9 shows the principles underlying the measurement. On the back 15 of the base 11, the same electrode pattern 40 as in the first embodiment shown in FIG. 3 noted above is formed, and a one-chip IC 60 which includes the measure circuit 165 is directly mounted.

Referring to FIGS. 8 and 9, the measure circuit 165 has an oscillator (i.e., AC power source) 170. The voltage from the oscillator 170 is impressed as accurate noninverted and inverted signals through operational amplifiers 171 and 172 on the capacitors 35 and 36 (with respective electrostatic capacitances CM and CR). At this time, the voltages VM and VR that are generated between the electrodes of the capacitors 35 and 36 have values meeting $dV_M/dt = I_M/C_M$ and dVR/dt=IR/CR, and the currents IM and IR caused through the capacitors 35 and 36 have values proportional to the electrostatic capacitances CM and CR. The signals impressed from the oscillator 170 may be a sine wave or a triangular wave.

Thus, a current I which is proportional to the difference (CM−CR) between the electrostatic capacitances of the capacitors 35 and 36, flows to an input terminal 174 of an operational amplifier 173 as an amplifying element. Thus, by setting the electrostatic capacitances CM and CR to be substantially equal and disposing the capacitors 35 and 36 such that changes ΔCM and ΔCR in the electrostatic capacitances CM and CR corresponding to the flexing of the diaphragm 12 caused by the pressure of the measurement fluid are ΔCM>ΔCR, that is, disposing the capacitor 35 (with electrostatic capacitance CM) on the center of the diaphragm 12 with the greatest extent of flexing, an output signal as a function of the pressure of the measurement fluid acting on the pressured surface 16 of the diaphragm 12, is obtainable at an output terminal 175 of the operational amplifier 173.

In FIG. 8, the dashed lines represent electric lines of force extending between the individual electrodes. Electric lines of force in this state are formed while reversing the direction in a predetermined cycle period according to the signal of the oscillator 170.

The circuit paths 63A and 63B which are made conductive with the electrode terminal 43 for the shield electrode 33 (see FIG. 3), are arranged such as to enclose the circuit path 64 including the electrode terminal 44 for the common electrode 34 (corresponding to the dashed line in FIG. 9). They are connected through grounding terminals 176 and 177 to a buffer element 178 to be grounded. The grounding terminals 176 and 177 are arranged such as to isolate the input terminal 174 of the operational amplifier 173 and signal impression terminals 179 and 180 of the operational amplifiers 171 and 172 from one another.

With such second embodiment, substantially like the previous first embodiment, it is possible to obtain highly accurate measurement and realize size reduction of the pressure sensor.

In the second embodiment, the output is detected as the difference (CM−CR) between the electrostatic capacitances of the capacitors 35 and 36, and therefore unlike the first embodiment it is impossible to avoid the influence of the dielectric constant changes caused by changes in he temperature and relative humidity of atmospheric air in the space 30. However, since the shield electrode 33 is provided, like the first embodiment it is possible to avoid the influence of the ceramic material and low-melting glass 23. Further, with the second embodiment the above effects can be realized with a simple circuit compared to the first embodiment.

Figure 10:
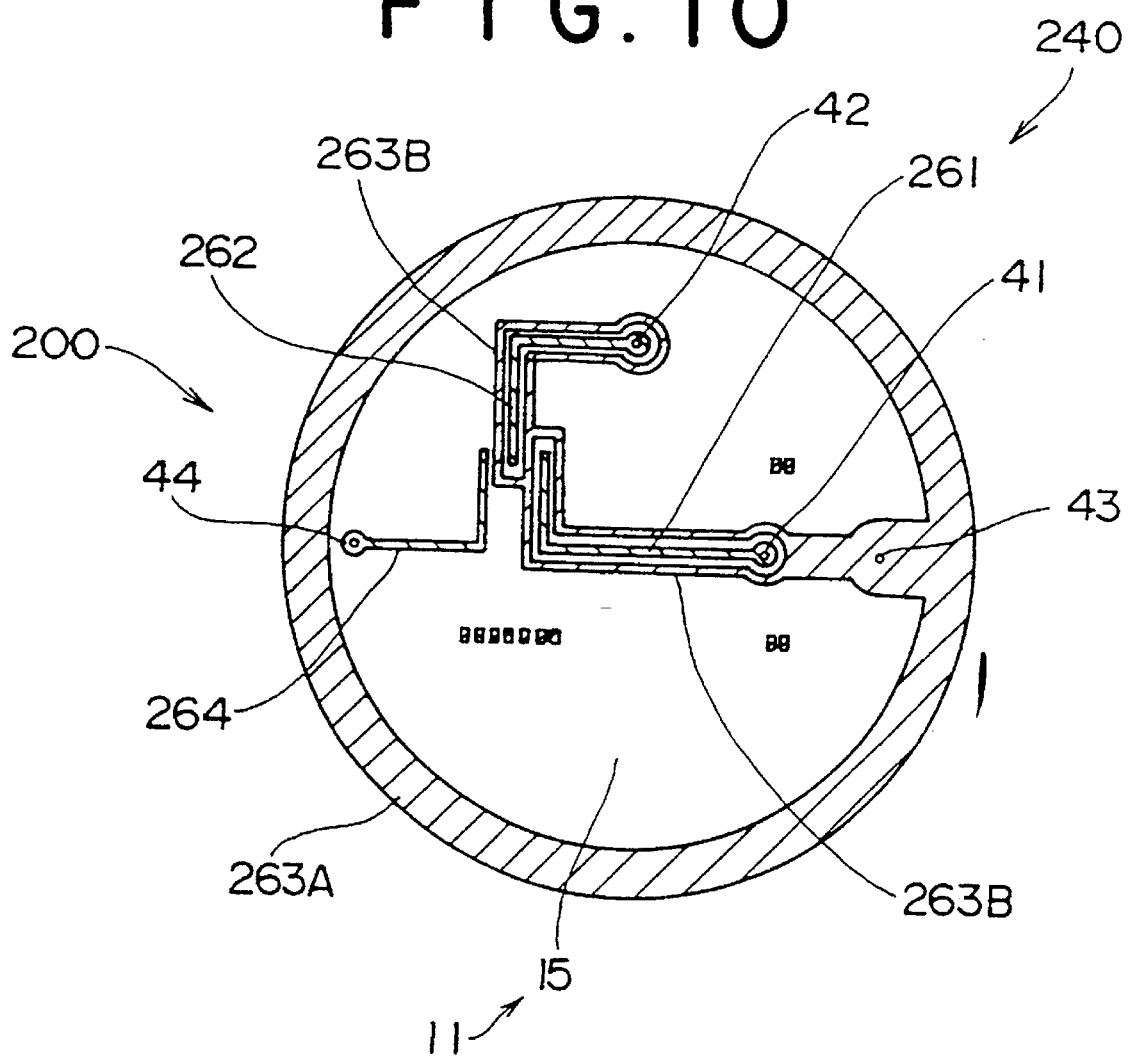
FIG. 10 is a view showing an electrode pattern on the back of a base in a third embodiment of the invention.
Figure 11:
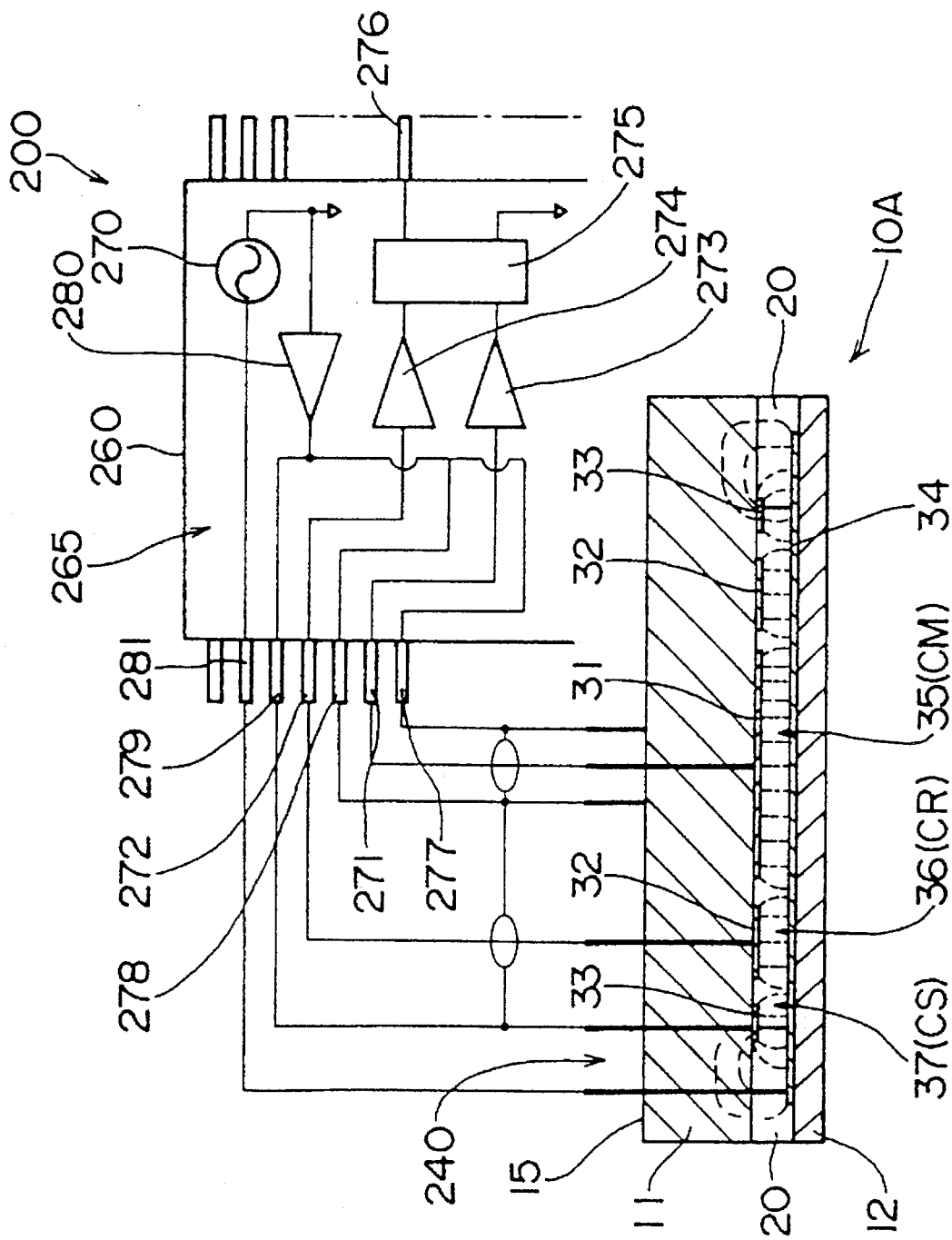
FIG. 11 is a schematic view showing the third embodiment.
Figure 12:
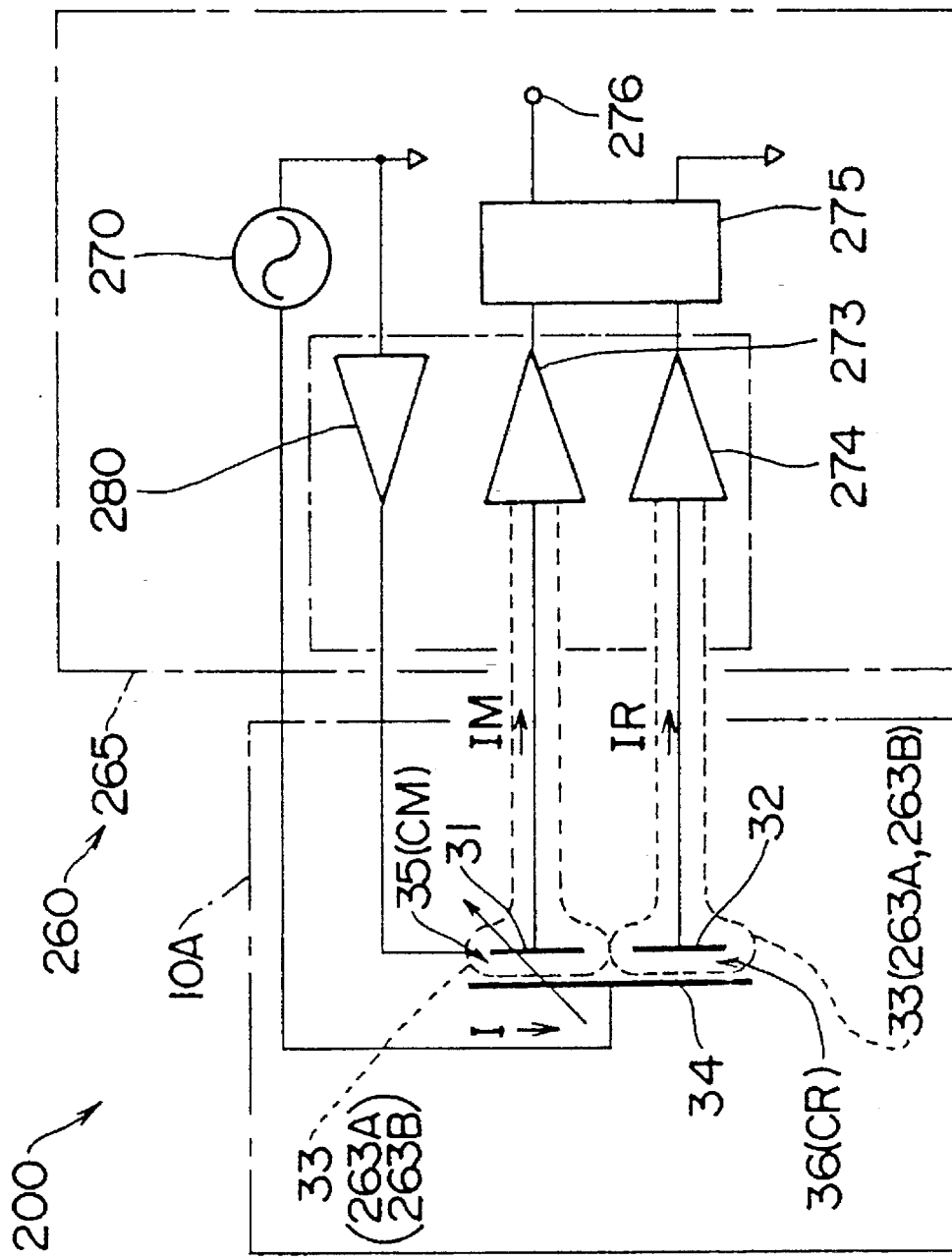
FIG. 12 is a view showing a measure circuit in the third embodiment.

FIGS. 10 to 12 show a pressure sensing element 200 of electrostatic capacitance type in a third embodiment of the invention.

The pressure sensing element 200, except the measure circuit built in the one-chip IC and the electrode pattern on the back of the base, is substantially the same in structure and functions as the preceding first and second embodiments, and also the method of manufacture is the same. Thus, like parts are designated by like reference numerals and not described in detail, and only different parts will be described.

FIG. 10 shows the detailed structure of electrode pattern 240 of the pressure sensing element 200. FIG. 11 shows the status of connection between the body 10A of the pressure sensing element 200 and the measure circuit 265 for measuring changes in the electrostatic capacitances CM, CR and CS of the capacitors 35 to 37 formed in the body 10A. FIG. 12 shows the principles underlying the measurement.

Referring to FIG. 10, the electrode pattern 240, which is different from that in the first and second embodiments, is provided on the back 15 of the base 11 of the pressure sensing element 200. The one-ship IC 260 is to be mounted directly on the electrode pattern 240. FIG. 10 shows the state before mounting the one-chip IC 260.

In the electrode pattern 240 in the third embodiment, the electrode terminals 41 to 44 for the central, reference shield and common electrodes 31 to 33, are formed in positions like those in the electrode pattern 40 in the first and second embodiments (see FIG. 3). Also, the key-shaped circuit paths 261, 262 and 264, which are led from the electrode terminals 41, 42 and 44 to the position of the pin of the one-chip IC 260, are of the same arrangement and shape as the circuit paths 61, 62 and 64 in the first and second embodiments. Further, the ring-like circuit path 263A formed on an outer edge portion of the back 11 of the base 11 and made conductive with the electrode terminal 43, is of the same arrangement and shape as the circuit path 63A of the first and second embodiments.

The electrode pattern 240 in the third embodiment, however, has a circuit path 263B, which is different in arrangement and shape from the circuit path 63B of the electrode pattern 40 in the first and second embodiments. The circuit path 63B in the electrode pattern 40 of the first and second embodiments is connected to the inner side of a left portion of ring-like the circuit path 63A in FIG. 3 and arranged such as to enclose the electrode terminal 44 for the common electrode 34 and the circuit path 64. On the other hand, the circuit path 263B of the electrode pattern 240 in the third embodiment is connected to an inner projection of a right side portion of the ring-like circuit path 263A in FIG. 10 and arranged such as to enclose the circuit paths 261 and 262 respectively including the electrode terminals 41 and 42 for the central and reference electrodes 31 and 32 independently at a predetermined distance. The circuit path 263B passes through the position of the pin of the one-chip IC 260 as alternate dispositional position with the ends of the circuit paths 261, 262 and 264 and is connected to grounding terminals 277 to 279 to be described later. The individual circuit paths 263A and 263B which are made conductive with the electrode terminal 43 for the shield electrode 33, are grounded.

Thus, the circuit path 264 including the electrode terminal 44 for the common electrode 34, on one hand, and the circuit paths 261 and 262 including the respective electrode terminals 41 and 42 for the central and reference electrodes 31 and 32, on the other hand, are isolated from one another by the circuit paths 263A and 263B as the grounding electrodes. It is thus possible to reduce the influence of an increase of the leak current due to reduction of the insulation resistance between the two.

Referring to FIGS. 11 and 12, the measure circuit 265 in the third embodiment, unlike the measure circuit 165 in the second embodiment, is impressed with the source power from the side of the common electrode 34.

The measure circuit 265 has an oscillator (AC power source) 270. The signal of the oscillator 270 is impressed through the common electrode 34 to the capacitors 35 and 36 (with electrostatic capacitances CM and CR) for exciting these capacitors to cause current I. At this time, currents IM and IR proportional to the electrostatic capacitances CM and CR are caused to flow to input terminals 271 and 272.

Operational amplifiers 273 and 274 amplifies the input signals, and an operational circuit 275 calculates the difference and outputs it to an output terminal 276. Thus, at the output terminal 276 an output signal can be obtained, which is a function of the pressure of the measurement fluid acting on the pressured surface 16 of the diaphragm 12. The signal which is impressed by the oscillator 270 may be a sine wave or a triangular wave.

An example of specific numerical values will now be given. With the pressure sensor specification of 0 to 2,000 mmH$_2$O, assuming the electrostatic capacitances CM and CR of the capacitors 35 and 36 to be 30 pF, for instance, the flexing of the diaphragm 12 caused with application of an AC signal from the oscillator 270 causes the electrostatic capacitances CM and CR to be changed by 6 to 8 pF and 1 to 2 pF, respectively. The difference between the two electrostatic capacitances thus becomes 5 to 6 pF.

Dashed lines in FIG. 11 show electric lines of force between electrodes. Electric lines of force in this state are formed with their direction reversed in a predetermined cycle according to the signal from the oscillator 270.

The circuit paths 263A and 263B which are electrically conductive with the electrode terminal 43 of the shield electrode 33 (see FIG. 10), are in such an arrangement as to enclose independently the circuit paths 261 and 262, respectively including the electrode terminals 41 and 42 for the central and reference electrodes 31 and 32 (corresponding to dashed lines in FIG. 12). They are connected through the grounding terminals 277 to 279 to the buffer element 280 to be grounded. The grounding terminals 277 to 279 are provided such as to separate the signal application terminal 281 from the oscillator 270 and the input terminals 271 and 272 of the individual operational amplifiers 273 and 274 from one another. This arrangement permits reduction of the influence of increase of leak current due to reduction of the insulation resistance between them.

With this third embodiment, like the previous first and second embodiments, it is possible to obtain as the effects high accuracy measurement and size reduction of the pressure sensor.

With the third embodiment, in which the operational circuit 275 takes the difference between the currents IM and IR for output detection, unlike the preceding first embodiment, it is impossible to avoid the influence of the dielectric constant changes with temperature or relative humidity changes in atmospheric air in the space 30. However, with the provision of the shield electrode 33, like the first embodiment it is possible to avoid the influence of the ceramic material, low-melting glass 23, etc. With the third embodiment, the above effects can be realized with a simple circuit compared to the first embodiment.

The above embodiments are by no means limitative, and changes and modifications may be made to attain the objects of the invention.

Figure 13:
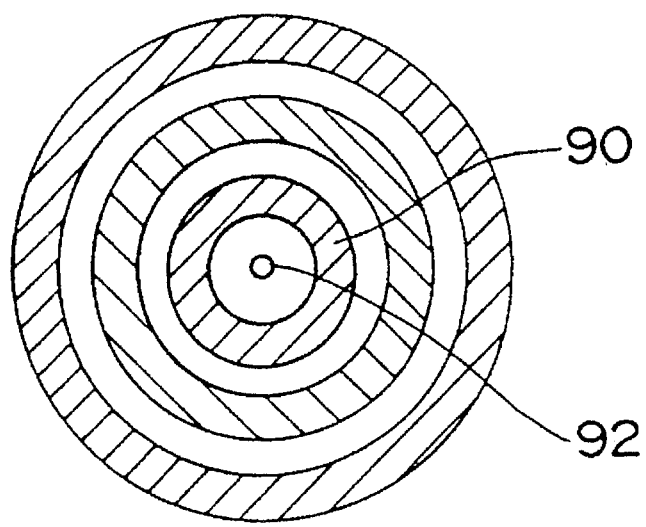
FIG. 13 is a view showing a first modification of the structure according to the invention.
Figure 14:
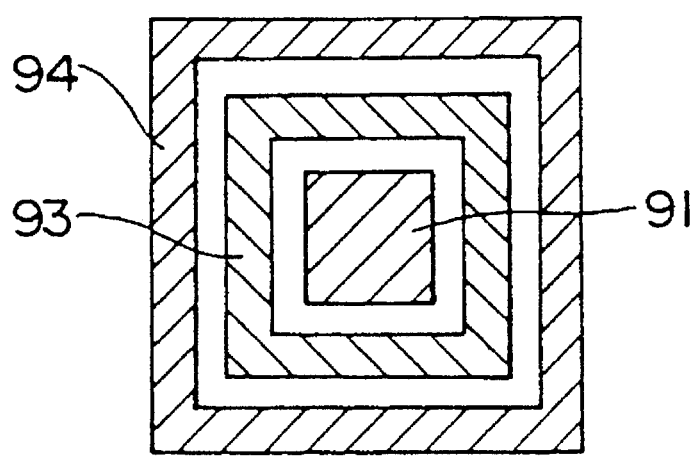
FIG. 14 is a view showing a second modification of the structure according to the invention.

For example, in the above embodiments the central electrode 31 on the side of the base 11 is circular, but this shape is not limitative. FIG. 13 shows a different example of the central electrode. This electrode 90 is ring-like like the reference and shield electrodes 32 and 33. FIG. 14 shows a further example of the central electrode. This electrode 91 is square in shape. In general, the central electrode may be of any simple shape so long as it provides less end effects. In the case of the ring-like electrode 90 shown in FIG. 13, it is possible to form within the electrode a low pressure port 92 for leading atmospheric air into the space 30. The shaded portions shown in FIGS. 13 and 14 are not any section but for facilitating the description.

The reference and shield electrodes 32 and 33 also need not be ring-like. For example, it is possible to form square loop electrodes 93 and 94 as shown in FIG. 14. In general, these electrodes may be of any closed loop form.

Further, while in the above embodiments the common electrode 34 on the side of the diaphragm 12 is circular, this is by no means limitative. For example, it is possible to adopt a polygonal shape close to a circle. In general, it is possible to adopt any shape so long as the outer edge is entirely on the outer side of the outer edge of the shield electrode 33 on the side of the base 11.

Further, while in the above embodiments three electrodes, i.e., the dentral, reference and shield electrodes 31 to 33, are formed on the side of the base 11, it is possible to form four or more electrodes. For example, it is possible to provide between the central and reference electrodes 31 and 32 an electrode, which corresponds to the shield electrode and is grounded or held at a predetermined voltage.

Further, in the first embodiment the measure circuit 65 provides an output signal which is related to the ratio (CR−CM)/(CR+CM) between the sum of and the difference between the electrostatic capacitances CM and CR of the capacitors 35 and 36, and in the second and third embodiments the measure circuits 165 and 265 each provide an output signal which is proportional to the difference (CM−CR) between the electrostatic capacitances CM and CR of the capacitors 35 and 36. However, it is possible to arrange such as to provide an output signal, which is related to various ratios concerning the electrostatic capacitances CM and CR other than (CR−CM)/(CR+CM), for instance (CR+CM)/(CR−CM), CM/CR, CR/CM, (CR−CM)/CR, (CR−CM)/CM, CR/(CR−CM) or CM/(CR−CM). In such cases, like the first embodiment, it is possible to obtain measurement by making up for the influence of changes in the temperature, relative humidity, etc. of atmospheric air in the space 30.

Figure 15:
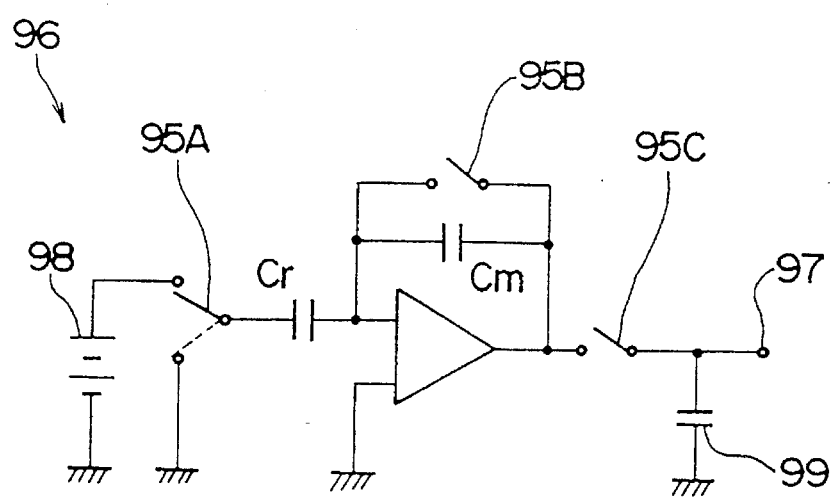
FIG. 15 is a view showing a third embodiment of the structure according to the invention.

FIG. 15 shows a modified measure circuit 96, which has switches 95A to 95C. An output signal related to the ratio CR/CM of the electrostatic capacitances CM and CR, can be obtained at an output terminal 97 by switching the switches 95A to 95C. When the switch 95A is connected to the side of a power supply 98, the switch 95B is closed while the switch 95C is opened, and charge is stored in the individual capacitors of the electrostatic capacitances CM and CR. When the switch 95A is connected to the ground side, the switch 95B is opened while the switch 95C is closed, and a predetermined level of charge is sampled and held in the capacitor 99.

Figure 16:
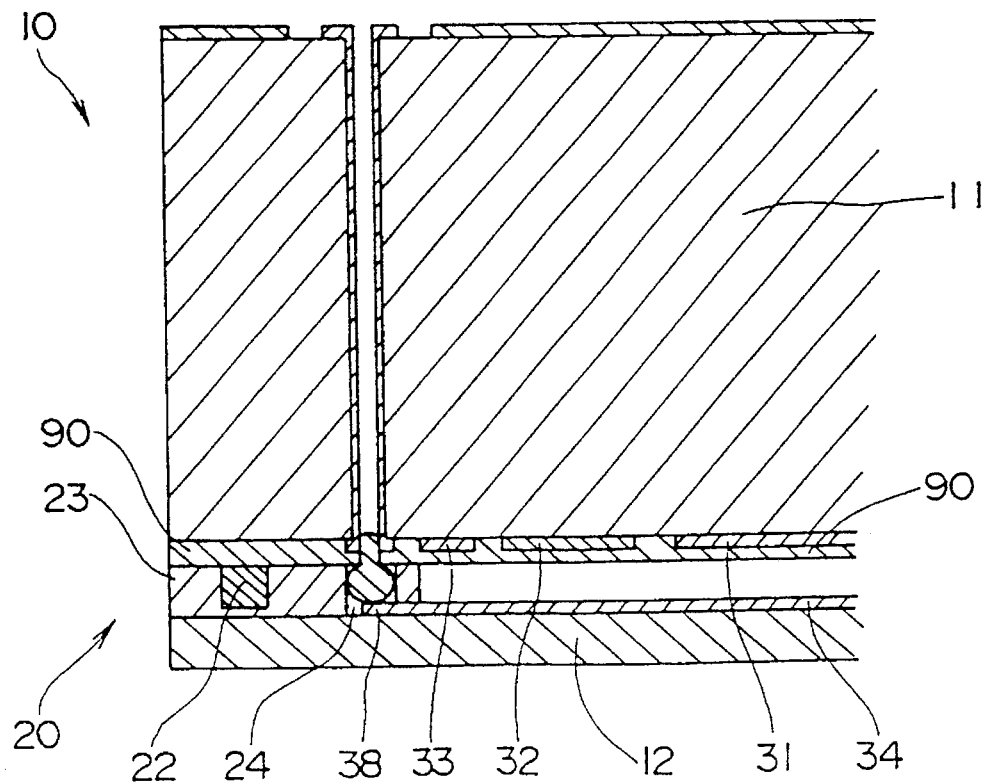
FIG. 16 is a fragmentary sectional view showing a fourth embodiment of the structure according to the invention.

Further, while in the above embodiments the overcoat glass part 21 is formed to cover part of and on the outer side of the shield electrode 33, it is also possible to form an overcoat glass part 90 as shown in FIG. 16, which covers the central and reference electrodes 31 and 32, in addition to the portion in which the overcoat glass part 21 is formed. With this arrangement, it is possible to prevent the short-circuit of these electrodes to the common electrode 34 when the diaphragm 12 is deformed excessively.

Figure 17:
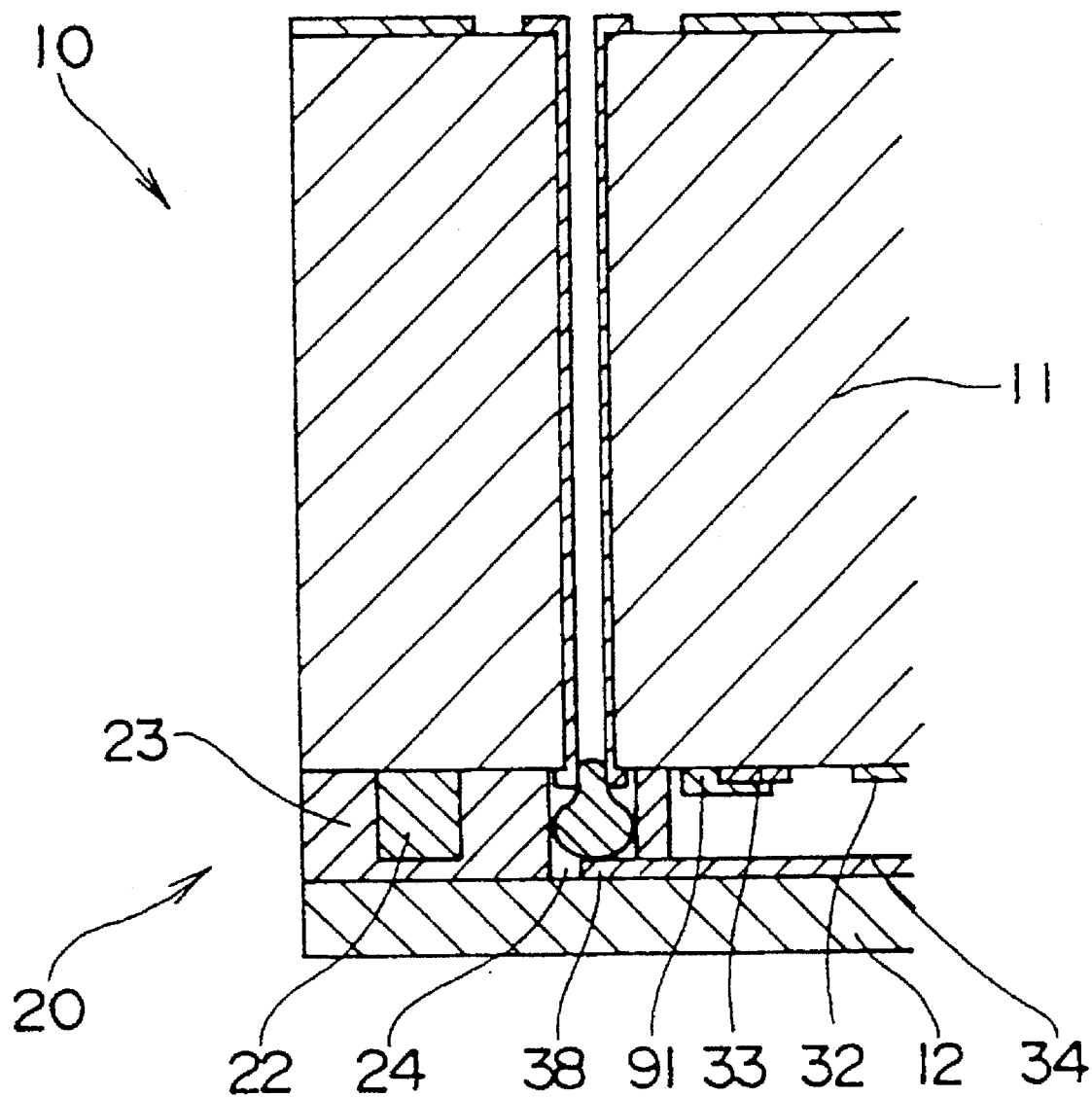
FIG. 17 is a fragmentary sectional view showing a fifth embodiment of the structure according to the invention.
Figure 18:
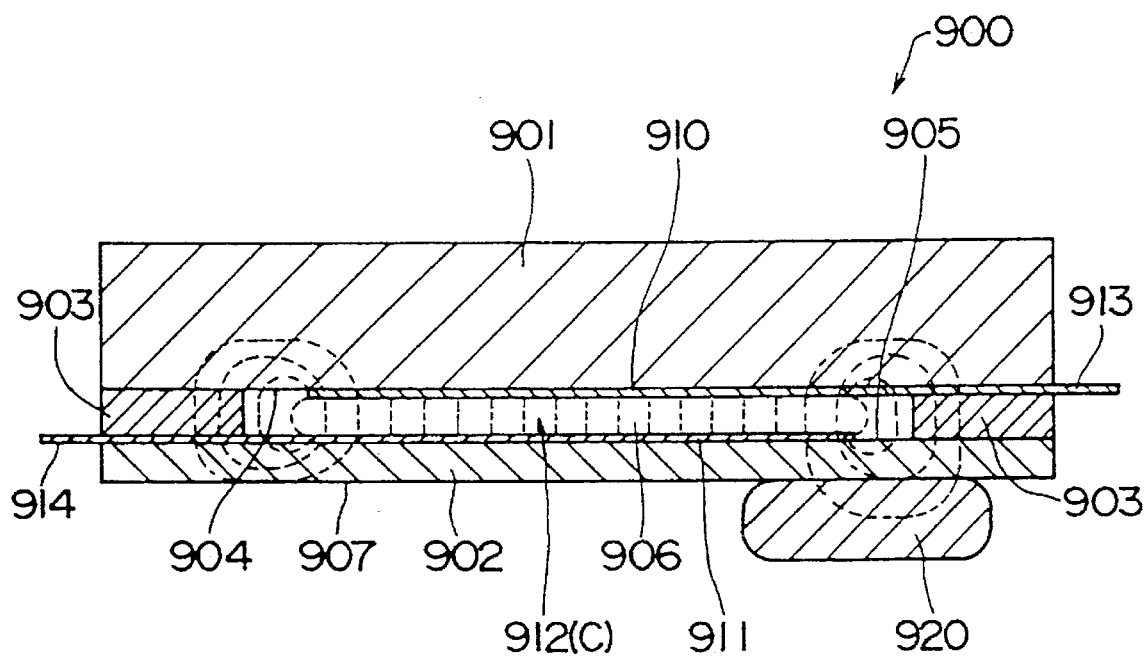
FIG. 18 is a sectional view showing a first prior art example.
Figure 19:
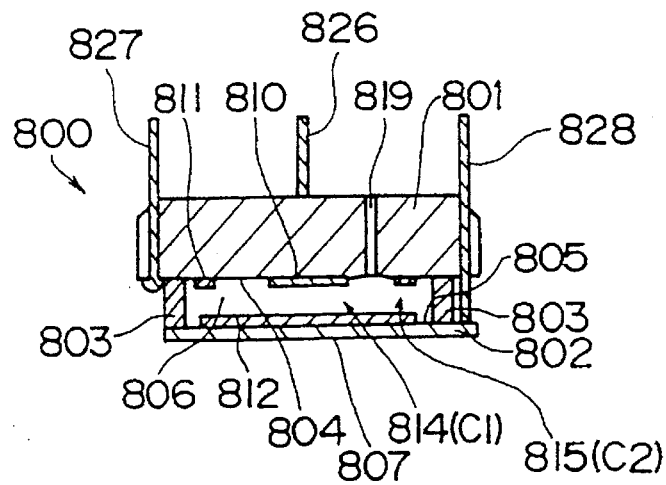
FIG. 19 is a sectional view showing a second prior art example.
Figure 20:
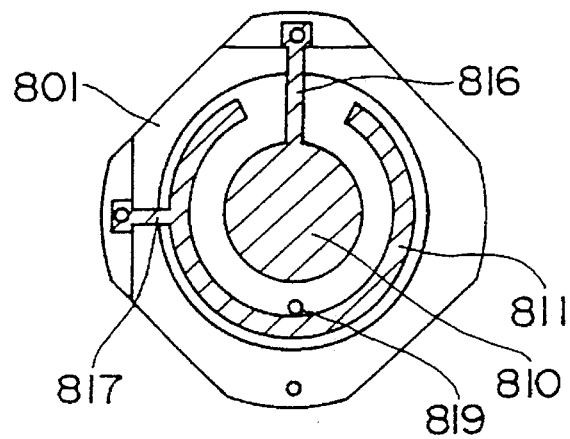
FIG. 20 is a disassembled view showing the second prior art example.
Figure 21:
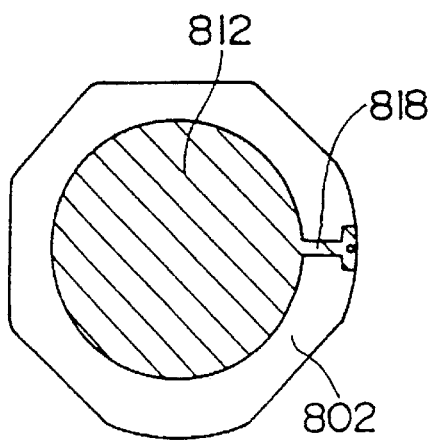
FIG. 21 is a different disassembled view showing the second prior art example.

Further, while in the above embodiments the overcoat glass part 21 is provided such as to constitute part of the spacer 20, it is also possible to provide an overcoat glass part 91 as shown in FIG. 17, which does not constitute the spacer 20 but covers only at least a portion of the shield electrode 33. Again in this case, it is possible to increase the creepage distance of insulation, thus increasing the creepage surface resistance.

The overcoat glass part 21 may be formed to cover not only a portion but the entirety of the shield electrode 33.

However, it is desirable to have a portion of the shield electrode 33 on the side of the reference electrode 32 exposed to the space 30 as in the above embodiments, because by so doing it is possible to improve the effect of absorption of leakage current from the reference electrode 32 to the common electrode 34 due to the shield electrode 33.

Further, the arrangement of the high- and low-melting glass parts 22 and 23 in the above embodiments (see FIG. 5) is by no means limitative. For example, the high-melting glass part 22 may be located further outward. Further, the method of formation of these parts in the above embodiments is by no means limitative. For example, it is possible to print the high-melting glass part 22 on the side of the diaphragm 12 and then bond the base 11 and diaphragm 12 with the low-melting glass 23. In general, any method may be adopted so long as the inter-electrode distance between the side of the base 11 and the side of the diaphragm 12 can be held at a predetermined distance matched to the measurement range of the pressure sensor.

Further, the thicknesses of the overcoat and high- and low-melting glass parts 21 to 23 are not limited to the specific values in the above embodiments but may be suitably determined such as to be able to form the above predetermined distance.

Further, while in the above embodiments the electrode holes 45 to 47 for the central, reference and shield electrodes 31 to 33 on the side of the base 11 are all provided with the through hole treatment, it is possible to have the opposite end inlets of all these electrode holes 45 to 47 open and utilize all the through holes formed in these electrode holes 45 to 47 as paths (low pressure ports) for leading atmospheric air into the space 30. Alternatively, inlets of some of the electrode holes 45 to 47 on the side of the back 15 may be closed while having the opposite end inlets of the remaining electrode holes open for utilizing only the through holes in the electrode holes, which have their opposite end inlets held open, as low pressure ports. In general, at least one of the through holes formed in the electrode holes 45 to 47 may be made available for utilization as a low pressure port.

Further, where a pressure sensing element 10 is covered by a casing, which is formed with a path for communicating the space 30 with the outside, in the consideration of the arrangement of the path formed in the casing, the inlets of the electrode holes 45 and 46 for the central and reference electrodes 31 and 32, for instance, may be held closed, while the inlet of the electrode hole 47 for the shield electrode 33 on the side of the back 15 may be communicated with the path formed in the casing, thus forming a single continuous path.

While in the above embodiments the conductor sections 51 to 53 in the electrode holes 45 to 47 are formed by vacuum suction from the opposite ends of the holes (see FIG. 7), this is by no means limitative. For example, they may be formed using a tool for passing a shoe string or the like. In general, any means may be adopted so long as it is possible to form through holes, which have a sectional profile as shown in FIG. 7 and can serve as paths for leading atmospheric air or like fluid into the space 30, and reliably make the individual electrodes 31 to 33 and the electrode terminals 41 to 43 thereof conductive with one another.

Further, the electrodes 31 to 34 need not be formed by the methods in the above embodiments such as printing, but may be formed by other usual means, for instance plating, etching, spattering, etc.

Further, the values of the thicknesses of the base 11 and diaphragm 12, thicknesses of the electrodes 31 to 34, inter-electrode distance, electrostatic capacitances CM, CR and CS of the capacitors 35 to 37 and other specifications of the pressure sensor, need not be limited to those shown specifically in the embodiments, but they may be suitably determined in dependence on the subject of measurement, measurement environments, etc.

Further, the electrode patterns 40 and 240 formed on the back 15 of the base 11 in the above embodiments, may be of any arrangement and have any shape so long as they include the electrode terminals 41 to 43 for the central, reference and shield electrodes 31 to 33 on the side of the base 11.

Further, while in the above embodiments the space 30 is held under the atmospheric pressure for detecting the pressure of the measurement fluid as gauge pressure, it is also possible to introduce the measurement fluid (in this case gas) into the space 30 as well so as to permit detection of the pressure difference between the pressure in the space 30 and the pressure applied to the pressured surface 16.

Further, the measurement fluid as the subject of pressure measurement by the pressure sensor including the pressure sensing element 10 according to the invention may be liquid or gas.

As has been described in the foregoing, according to the invention the electrode on the base side is formed as a plurality of division electrodes, and the outermost one thereof is imparted with a function of stabilizing the measurement value. It is thus possible to obtain accurate pressure measurement.

Specifically, the outermost one of the base side division electrodes is grounded or held at a predetermined voltage and not used for the measurement, so that accurate pressure measurement can be obtained without being influenced by changes in the temperature, relative humidity, etc. of ambient objects. In addition, since the base side division electrodes except for the central one are in simple ring-like forms, it is possible to simplify the process of manufacture.

Further, since the overcoat glass part is provided such as to cover at least a portion of the Outermost one of the base side division electrodes, the inter-electrode creepage distance of insulation between the base side and the elastic diaphragm side is increased to increase the creepage surface resistance, it is possible to suppress the leakage current between these sides and permit accurate pressure detection.

Further, since atmospheric air or like fluid providing the reference pressure for the pressure measurement is introduced into the space formed between the base and elastic diaphragm, it is possible to simplify the structure of the pressure sensor and reduce the steps of the process of manufacture.

What is claimed is:

1. A pressure sensor for measuring the pressure of a fluid, said pressure sensor comprising:

a base formed of ceramic material having a front surface and a back surface opposite said front surface;

an elastically deformable diaphragm made of ceramic material secured to said base front surface so as to be spaced apart a predetermined distance from said base front surface to define a pressure chamber therebetween, said diaphragm having an inner surface that partially defines said pressure chamber and a pressure face opposite said inner surface which is exposed to the fluid;

a plurality of electrodes provided on said base front surface, said base electrodes including a center electrode and an outer ring electrode, said outer ring electrode being spaced apart from and completely surrounding said center electrode;

a diaphragm electrode attached to said diaphragm inner surface so as to form a capacitor with said base center electrode;

a capacitance measuring circuit for measuring the capacitance across said base center electrode and said diaphragm electrode so as to produce an output signal based on said measured capacitance that is representative of the pressure of the fluid; and a first conductor connected between said base center electrode and said capacitance measuring circuit, a second conductor connected between said diaphragm electrode and said capacitance measuring circuit and a third conductor connected between said base outer ring electrode and said capacitance measuring circuit, wherein said capacitance measuring circuit is configured to apply signals through said first and second conductors to measure said base center electrode-diaphragm electrode capacitance and to apply a signal to said outer ring electrode through said third conductor to hold said outer ring electrode at a constant voltage.

2. The pressure sensor of claim 1, wherein:

said base front surface is provided with an inner ring electrode between said center electrode and said outer electrode, said inner ring electrode being spaced apart from said center electrode and outer ring electrode and completely surrounding said center electrode and said diaphragm electrode functions as a common electrode relative to said base center electrode and said base inner ring electrode so that a first capacitance, CM, develops across said base center ring electrode-diaphragm electrode subassembly and a second capacitance, CR, develops across said base inner ring electrode-diaphragm electrode sub-assembly; and said capacitance measuring circuit is configured to measure said CM and CR capacitances and to generate said pressure-dependent output signal as a function of capacitances CM and CR.

3. The pressure sensor of claim 2, wherein said capacitance measuring circuit is configured to produce said pressure-dependent output signal as a function of one of the following ratios: (CR−CM)/(CR+CM); (CR+CM)/(CR−CM); CM/CR, CR/CM; (CR−CM)/CR; (CR−CM)/CM; CR/(CR−CM) and CM/(CR−CM).

4. The pressure sensor of claim 1, wherein:

said base outer ring electrode has an outer perimeter and said diaphragm electrode is shaped to have a circumference so as to have an edge section that extends beyond said outer perimeter of said base outer ring electrode; and said second conductor extends from a terminal located on said base back surface through said base and is connected to a point on said diaphragm electrode edge section.

5. The pressure sensor of claim 1, wherein said diaphragm and said base are sealed so as to seal said pressure chamber.

6. The pressure sensor of claim 1, wherein said base is formed to define a bore that extends to said pressure chamber so that said pressure chamber can be pressurized to a reference pressure.

7. A pressure sensor for measuring the pressure of a fluid, said sensor comprising:

a base formed of ceramic material having a front surface and a back surface opposite said front surface;

an elastically deformable diaphragm made of ceramic material secured to said base front surface so as to be spaced apart a predetermined distance from said front surface so as to define a pressure chamber therebetween, said diaphragm having an inner surface that partially defines said pressure chamber and a pressure face opposite said inner surface which is exposed to the fluid;

a plurality of electrodes provided on said base front surface, said base electrodes include a center electrode and an outer ring electrode, said outer ring electrode spaced apart from and completely surrounding said center electrode;

a diaphragm electrode attached to said diaphragm inner surface so as to form a capacitor with at least said base center electrode;

a capacitance measuring circuit for measuring the capacitance across said base center electrode and said diaphragm electrode so as to produce an output signal based on said measured capacitance that is representative of the pressure of the fluid;

a first conductor connected between said base center electrode and said capacitance measuring circuit and a second conductor connected between said diaphragm electrode and said capacitance measuring circuit and a third conductor connected between said base outer ring electrode and said capacitance measuring circuit; and an insulating glass layer positioned to at least partially cover said base outer ring electrode.

8. The pressure sensor of claim 7, wherein said insulating glass layer is formed from passivation glass.

9. The pressure sensor of claim 7, wherein said insulating glass layer further at least partially covers the portion of said base center electrode located radially inward from said outer ring electrode.

10. The pressure sensor of claim 7, wherein said insulating glass layer covers all of each said base electrode.

11. The pressure sensor of claim 7, wherein said measuring circuit is configured to hold said base outer ring electrode at a constant voltage.

12. The pressure sensor of claim 11, wherein:

said base front surface is provided with an inner ring electrode between said center electrode and said outer electrode, said inner ring electrode being spaced apart from said center electrode and outer ring electrode and completely surrounding said center electrode and said diaphragm electrode functions as a common electrode relative to said base center electrode and said base inner ring electrode so that a first capacitance, CM, develops across said base center ring electrode-diaphragm electrode subassembly and a second capacitance, CR, develops across said base inner ring electrode-diaphragm electrode sub-assembly; and said capacitance measuring circuit is configured to measure said CM and CR capacitances and to generate said pressure-dependent output signal as a function of capacitances CM and CR.

13. The pressure sensor of claim 12, wherein said capacitance measuring circuit is configured to produces said pressure-dependent output signal as a function selected of one of the following ratios: (CR−CM)/(CR+CM), (CR+CM)/(CR−CM), CM/CR, CR/CM, (CR−CM)/CR, (CR−CM)/CM, CR/(CR−CM) and CM/(CR−CM).

14. The pressure sensor of claim 12, wherein said insulating glass layer covers each said base electrode.

15. A pressure sensor for measuring the pressure of a fluid, said pressure sensor comprising:

a main body including a ceramic base formed with a front surface and a back surface opposite said front surface;

a ceramic, elastically deformable diaphragm coupled to and spaced from said ceramic base front surface so as to define a pressure chamber therebetween, said diaphragm having an inner surface that defines said pressure chamber and a pressure face opposite said inner surface that is exposed to the fluid, said diaphragm being elastically deformable as a function of the pressure applied thereto;

at least one measuring electrode disposed on said ceramic base front surface, a shield electrode disposed on said ceramic base front surface, said shield electrode being spaced away from and circumferentially surrounding said at least one measuring electrode, and a common electrode disposed on said diaphragm inner surface;

conductive members that extend through said ceramic base from said at least one measuring electrode, said shield electrode, and said common electrode to said ceramic base back surface, each said conductive member terminating at a conductive terminal on said ceramic base back surface;

a signal processing circuit connected to said electrodes and located on said ceramic base back surface, said signal processing circuit being configured to apply a stimuli signal across said at least one measuring electrode and said common electrode, to measure a response from said electrodes to said stimuli signal and to generate an output signal based on said measured response that is a function of the pressure of the fluid and to hold said shield electrode at a constant voltage; and a conductive pattern formed on said ceramic base back surface, said conductive pattern including a plurality of conductive traces for connecting said conductive member terminals to said signal processing circuit, wherein said conductive member terminal associated with said shield electrode is connected to a conductive trace positioned on said ceramic base back surface that separates said conductive member terminal to which said measuring electrode is connected from said conductive member terminal to which said common electrode is connected.

16. The pressure sensor of claim 15, wherein:

said ceramic base front surface is provided with a first measuring electrode and a second measuring electrode spaced from said first electrode and said common electrode on said diaphragm functions as a common electrode relative to said ceramic base first and second measuring electrodes so that a first capacitance, CM, develops across said ceramic base first measuring electrode and said common electrode and a second capacitance, CR, develops across said ceramic base second measuring electrode and said common electrode;

separate said conductive members are connected to said first measuring electrode, said second measuring electrode, said common electrode and said shield electrode and each said conductive member is connected to separate terminal on said ceramic base back surface;

and said conductive pattern is formed on said ceramic base back so that said conductive trace connected to said shield electrode separates said terminal connected to said common electrode from said terminals connected to said first and second measuring electrodes; and said signal processing circuit is configured to: place a single across said first measuring electrode and said common electrode; to place a signal across said second measuring electrode and said common electrode; to produce said pressure-dependent output signal as a function selected of one of the following ratios: (CR−CM)/(CR+CM); (CR+CM)/(CR−CM), CM/CR, CR/CM; (CR−CM)/CR, (CR−CM)/CM; CR/(CR−CM) and CM/(CR−CM); to zero adjust said pressure-dependent output signal; and to produce said pressure-dependent output signal so that said signal is linearly compensated.

17. The pressure sensor of claim 16, wherein said conductive trace connected to said shield electrode is further shaped to separate said terminal connected to said first measuring electrode from said terminal connected to said second measuring electrode.

18. The pressure sensor of claim 15, wherein said signal processing circuit is contained within a single-chip integrated circuit mounted to said back of said ceramic base.

19. The pressure sensor of claim 15, wherein said pressure chamber is a sealed chamber.

20. The pressure sensor of claim 15, wherein said conductive pattern formed on said ceramic base back surface includes a conductive ground ring formed around an outer perimeter of said ceramic base back surface and said ground ring is connected to said conducive trace to which said shield electrode is connected.

21. The pressure sensor of claim 15, wherein at least a portion of said conductive trace formed on said ceramic base back surface is coated by a protective, insulating layer.

* * * * *

UNITED STATES PATENT AND TRADEMARK OFFICE
CERTIFICATE OF CORRECTION

PATENT NO. : 5,561,247
DATED : October 1, 1996
INVENTOR(S) : Eiji MUTOH et al

It is certified that error appears in the above-indentified patent and that said Letters Patent is hereby corrected as shown below:

Column 28, line 18; change "single" to ---signal---.
line 43; change "conducive" to
---conductive---.

Signed and Sealed this

Twentieth Day of May, 1997

Attest:

BRUCE LEHMAN

Attesting Officer

Commissioner of Patents and Trademarks